United States Patent
Tamura

(10) Patent No.: US 7,940,873 B2
(45) Date of Patent: May 10, 2011

(54) DATA REPRODUCTION CIRCUIT

(75) Inventor: Hirotaka Tamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 955 days.

(21) Appl. No.: 11/359,504

(22) Filed: Feb. 23, 2006

(65) Prior Publication Data

US 2007/0064850 A1  Mar. 22, 2007

(30) Foreign Application Priority Data

Sep. 16, 2005  (JP) ................. 2005-271024

(51) Int. Cl.
*H04L 7/00* (2006.01)
*H03D 3/24* (2006.01)

(52) U.S. Cl. ........................ 375/355; 375/375

(58) Field of Classification Search ............ 375/354, 375/355, 371, 373, 375, 376
See application file for complete search history.

(56) References Cited

U.S. PATENT DOCUMENTS

| | | | |
|---|---|---|---|
| 4,669,092 A | 5/1987 | Sari et al. | |
| 5,379,323 A | 1/1995 | Nakaya | |
| 6,606,364 B1* | 8/2003 | Walley et al. ............ | 375/375 |
| 7,187,727 B2 | 3/2007 | Saeki | |
| 2003/0156662 A1 | 8/2003 | Engl et al. | |
| 2004/0202266 A1* | 10/2004 | Gregorius et al. ........... | 375/355 |
| 2005/0281366 A1* | 12/2005 | Shachar et al. ............... | 375/376 |
| 2006/0008041 A1 | 1/2006 | Kim et al. | |
| 2006/0078079 A1* | 4/2006 | Lu ................. | 375/376 |
| 2006/0256909 A1* | 11/2006 | On et al. ...................... | 375/376 |

FOREIGN PATENT DOCUMENTS

| | | |
|---|---|---|
| EP | 1 009 125 A2 | 6/2000 |
| JP | 10-313302 A | 11/1998 |
| JP | 11-261409 A | 9/1999 |
| JP | 2001-320353 A | 11/2001 |
| JP | 2002-190724 A | 7/2002 |
| JP | 2004-088386 A | 3/2004 |
| KR | 10-2000-0056356 A | 9/2000 |
| KR | 2001-0034228 | 4/2001 |
| WO | WO 99/37067 | 7/1999 |

* cited by examiner

Primary Examiner — Betsy L Deppe
(74) Attorney, Agent, or Firm — Arent Fox LLP

(57) ABSTRACT

This is a data reproduction circuit for receiving data and reproducing the data and its clock which has an over-sampling determination circuit for sampling the received data by a clock with frequency higher than the data rate of the received data and converting the sampled data into digital signals, a circuit for selecting and outputting the reproduced data, a phase error detection circuit for detecting a phase error from its timing deviation with the received data, based on the reproduced clock, a data selection circuit for adjusting its phase, based on the output of the phase error detection circuit, a phase adjustment circuit for adjusting the phase of the reproduced clock to reproduce a new clock and a clock generation circuit for supplying the over-sampling determination circuit and the data selection circuit with the newly reproduced clock.

5 Claims, 31 Drawing Sheets

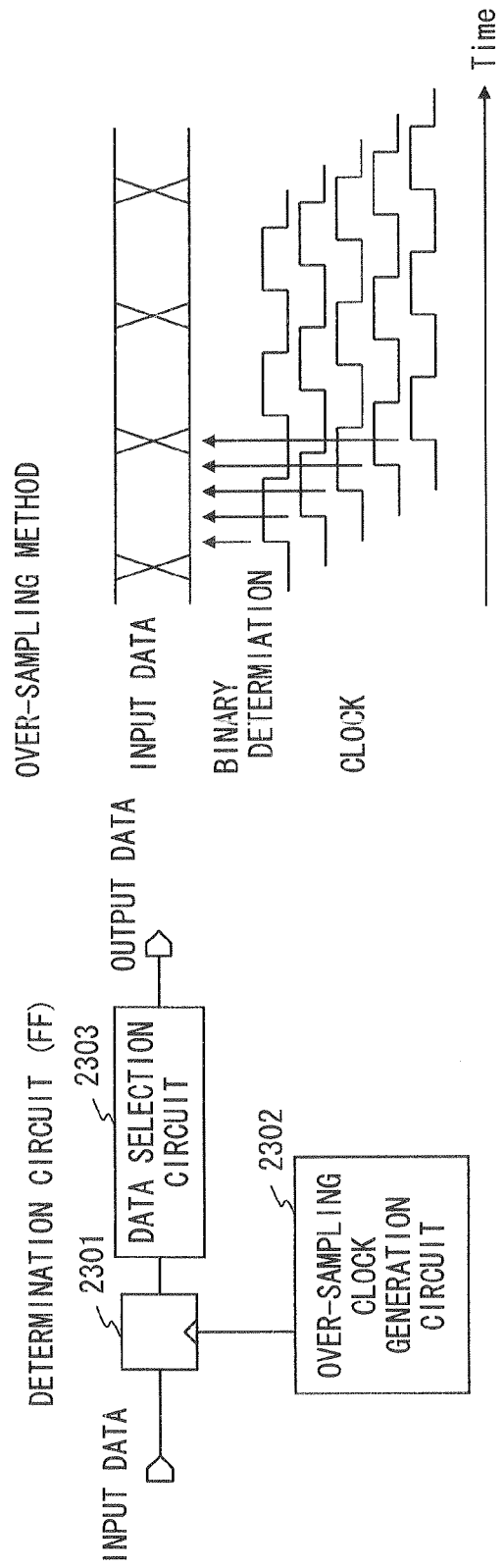

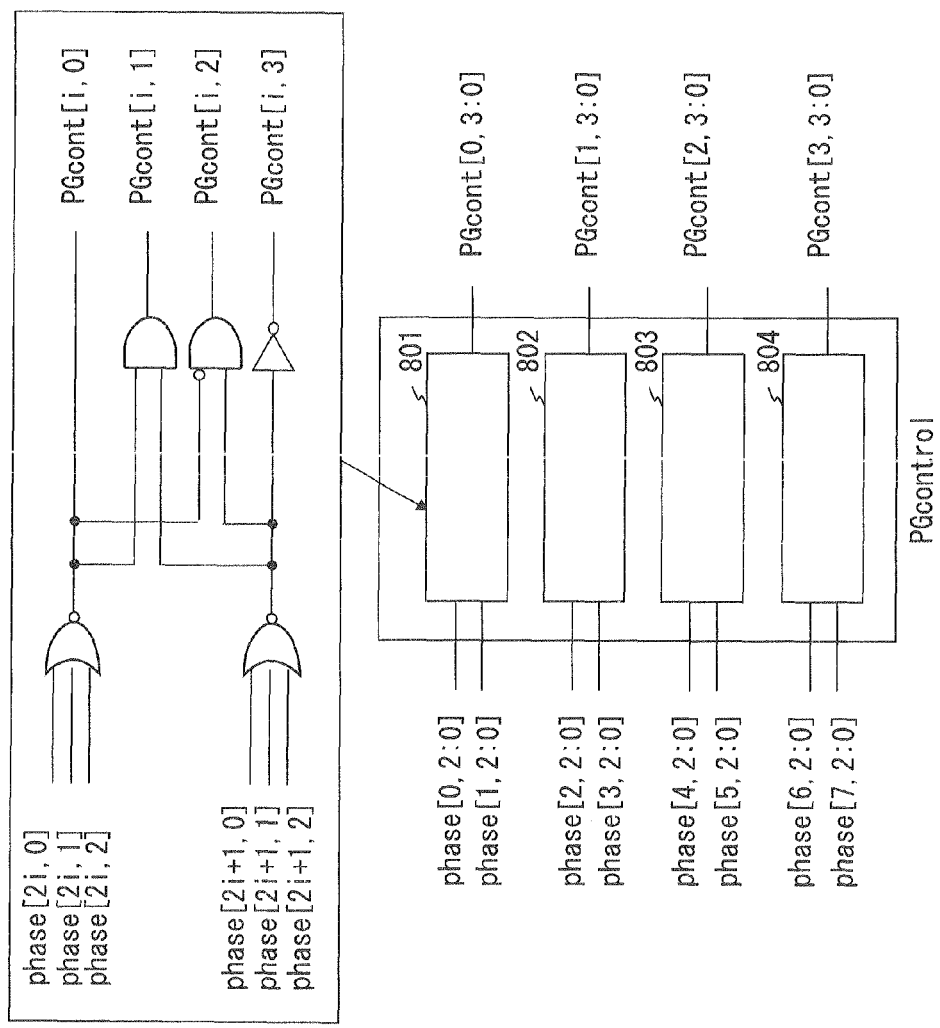
F I G. 11

Figure 1:
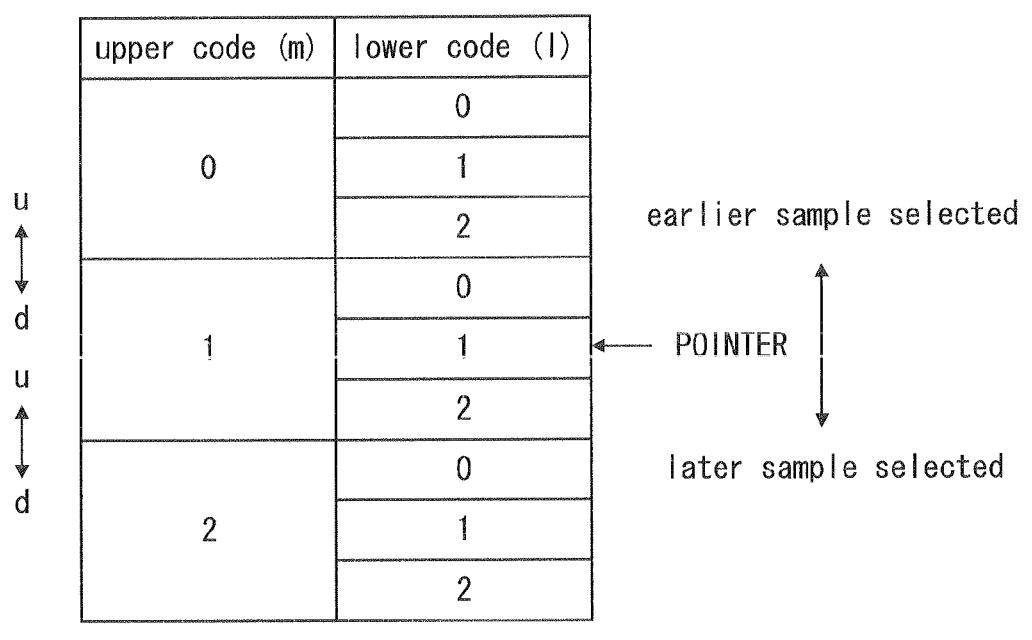

| upper code (m) | lower code (l) |
|---|---|
| 0 | 0 |
|   | 1 |
|   | 2 |
| 1 | 0 |
|   | 1 ← POINTER |
|   | 2 |
| 2 | 0 |
|   | 1 |
|   | 2 | earlier sample selected later sample selected

F I G. 1 3

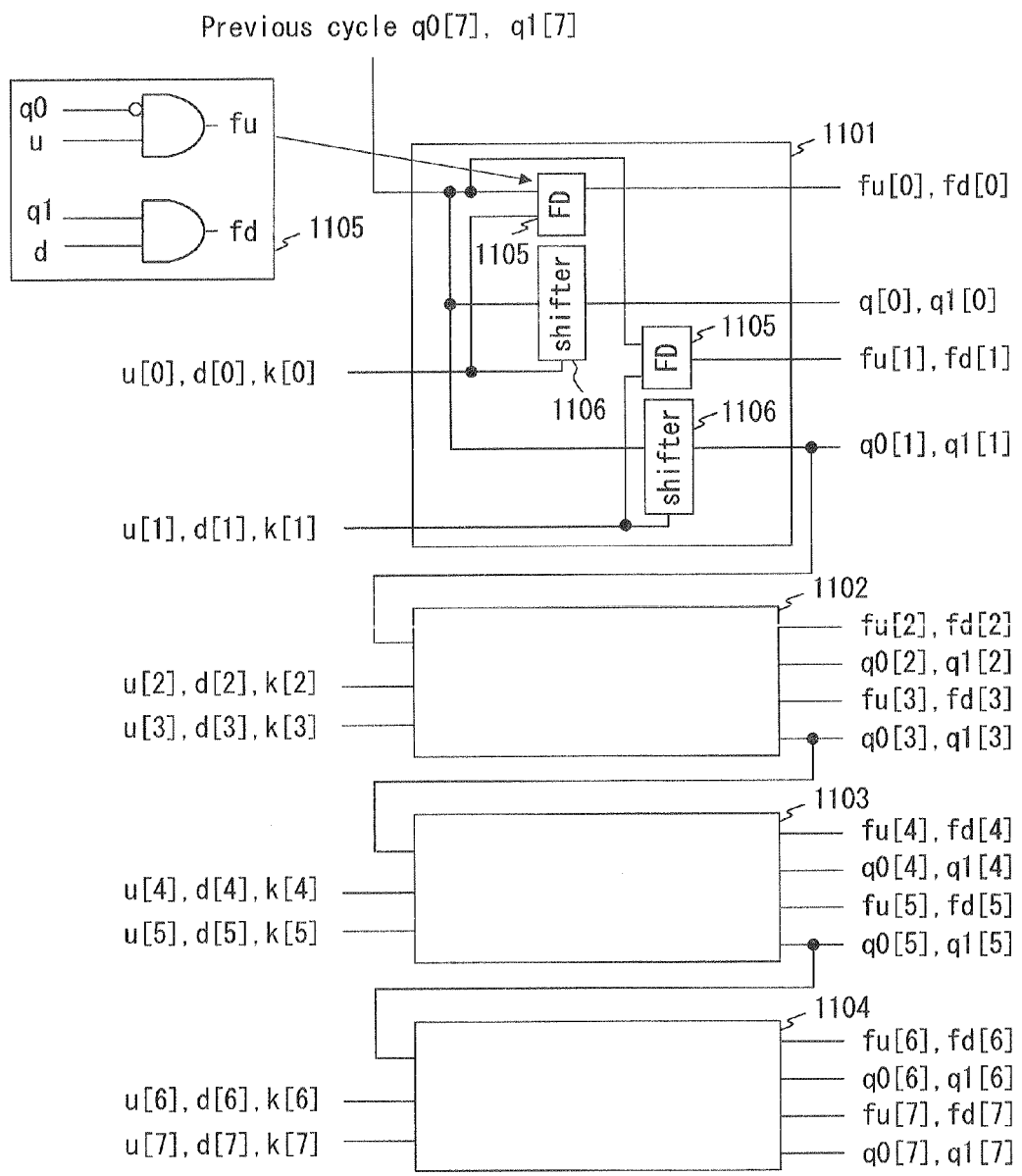
F I G. 1 4

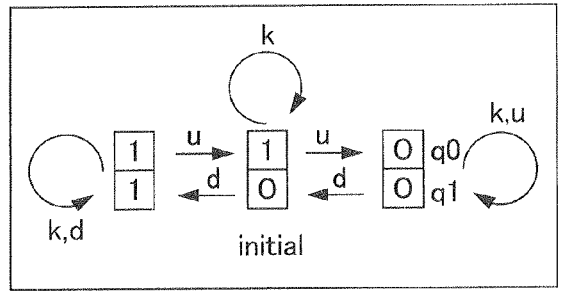
FIG. 16A
| in_q0 | in_q1 | u | k | d | out_q0 | out_q1 |
|---|---|---|---|---|---|---|
| 0 | 0 | 1 | 0 | 0 | 0 | 0 |
| 0 | 0 | 0 | 1 | 0 | 0 | 0 |
| 0 | 0 | 0 | 0 | 1 | 1 | 0 |
| 1 | 0 | 1 | 0 | 0 | 0 | 0 |
| 1 | 0 | 0 | 1 | 0 | 1 | 0 |
| 1 | 0 | 0 | 0 | 1 | 1 | 1 |
| 1 | 1 | 1 | 0 | 0 | 1 | 0 |
| 1 | 1 | 0 | 1 | 0 | 1 | 1 |
| 1 | 1 | 0 | 0 | 1 | 1 | 1 |
| 0 | 1 | X | X | X | prohibited | |
FIG. 16B
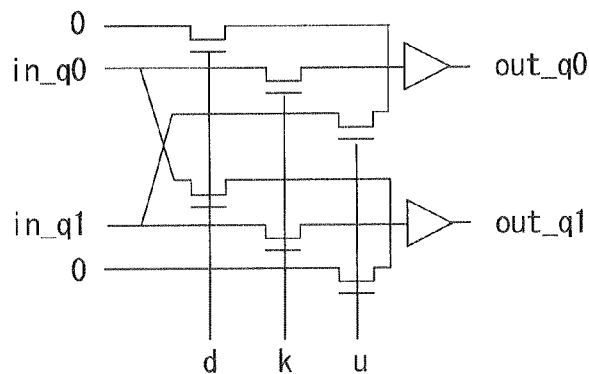
FIG. 16C

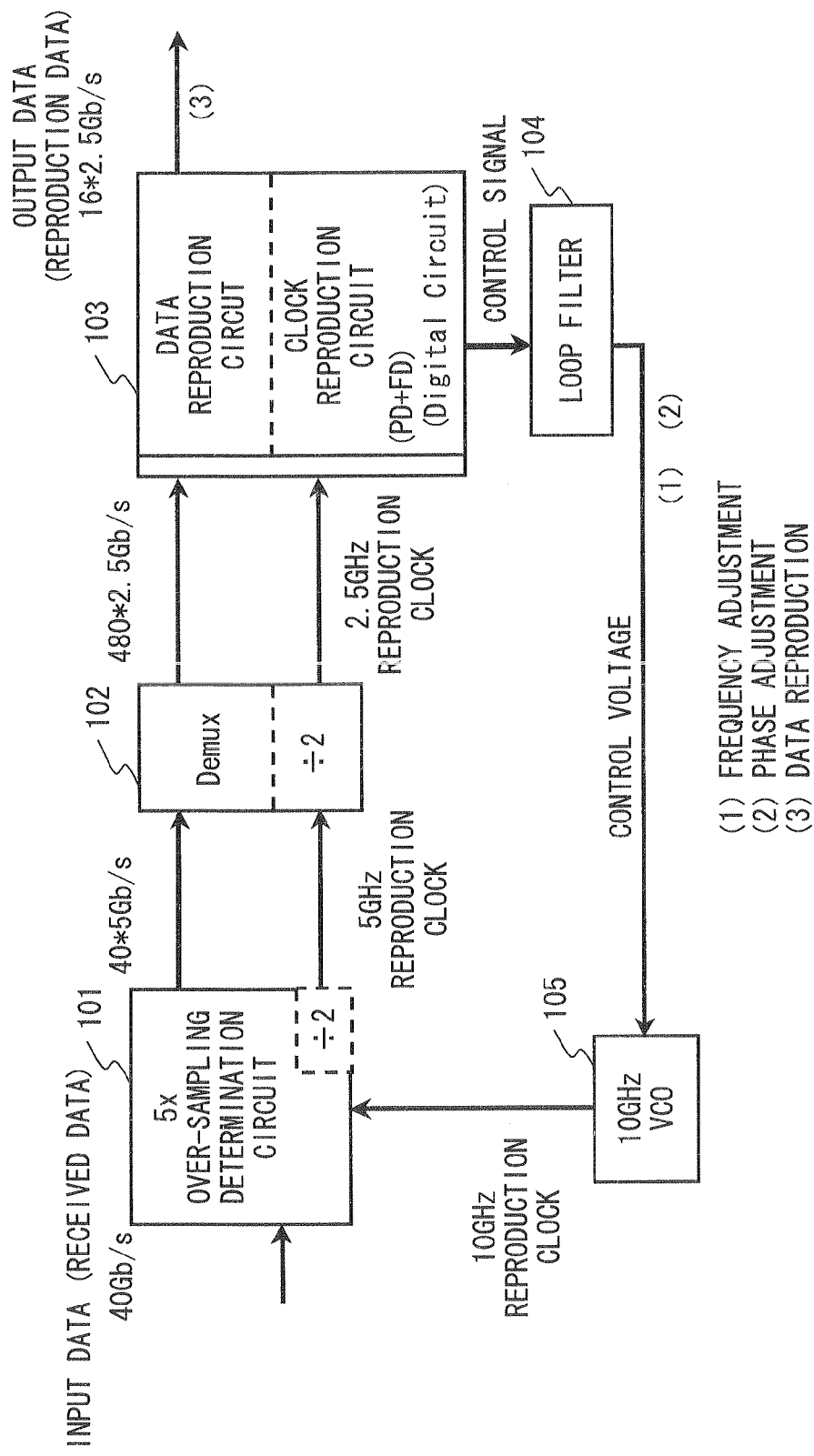
F I G. 19

| upper code (m) | lower code (l) |
|---|---|
| 0 | 0 |
|   | 1 |
|   | 2 |
| 1 | 0 |
|   | 1 |
|   | 2 |
| 2 | 0 |
|   | 1 |
|   | 2 | earlier sample selected later sample selected

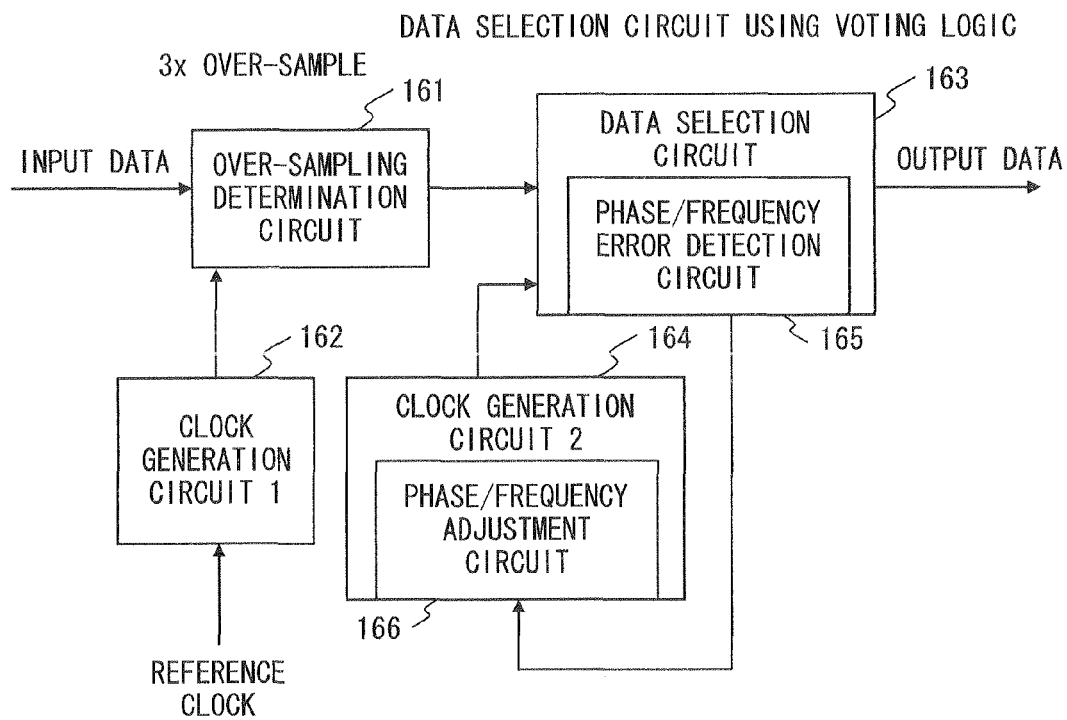
F I G. 25

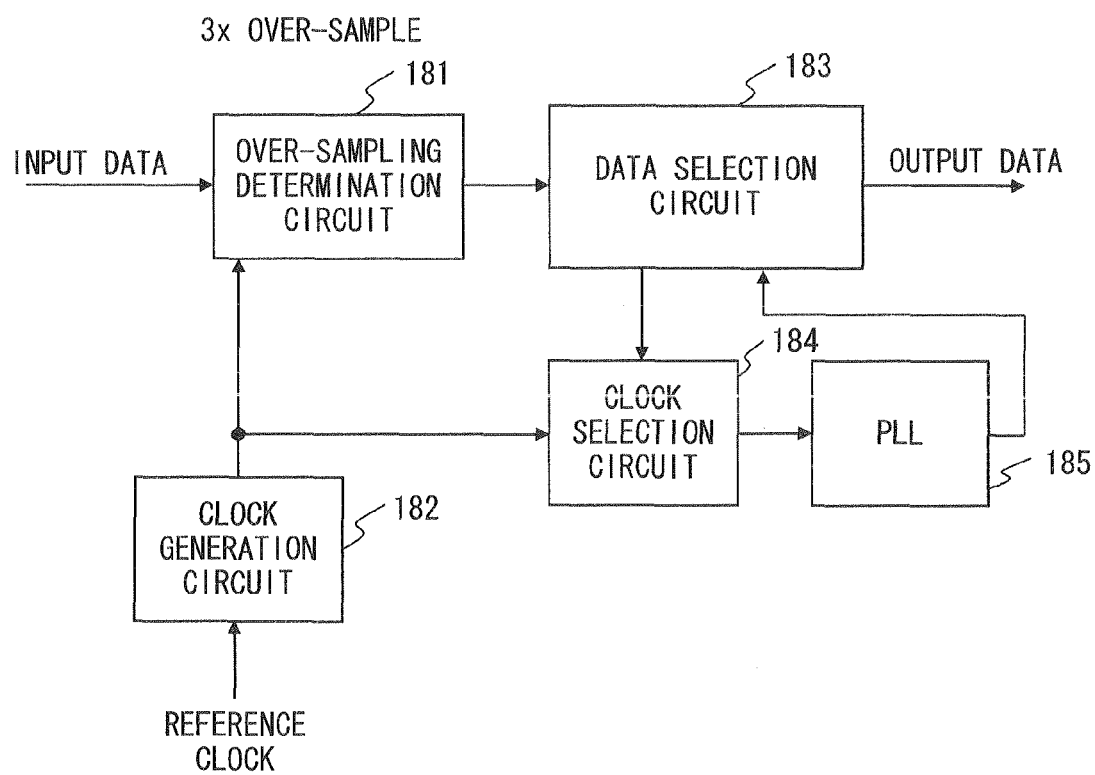
F I G. 2 7

DATA REPRODUCTION CIRCUIT

CROSS-REFERENCE TO RELATED APPLICATIONS

This application is based upon and claims the benefit of priority from the prior Japanese Patent Application No. 2005-271024 filed on Sep. 16, 2005, the entire contents of which are incorporated herein by reference.

BACKGROUND OF THE INVENTION

1. Field of the Invention

The present invention relates to reproduction of clock and data in high-speed transmission, and more particularly relates to a technology for transmitting signals between LSI chips, between a plurality of devices and circuit blocks in an LSI chip and, between boards and between cabinets at high speed.

2. Description of the Related Art

Today, in order to improve the performance of a system, the performance of components composing a computer and other information processing equipment, such as static random-access memory (SRAM), dynamic random-access memory (DRAM), a processor, a switching LSI and the like, is improved. In order to improve the performance of a system, using such a high-performance component, an LSI device or the like, signal transfer speed must be improved. Specifically, the increase of a data transfer rate measured by bit/second and transmission delay must be reduced.

For example, a speed gap at the time of transmission between memory, such as SRAM, DRAM or the like and a processor has a tendency to increase, and this speed gap disturbs the performance improvement of a computer. Besides the speed gap at the time of transmission, with a larger-scaled chip in an LSI, the signal transmission speed between a device and a circuit block in the chip is a big factor in restricting the performance of the chip.

Furthermore, the signal transmission speed must also be improved between servers or boards.

Conventionally, in order to realize signal transmission/reception at such a high data rate described above (to improve signal transmission speed), a clock must be generated in synchronization with data reception and data must be determined by the clock. In this case, although data determination generally means binary determination of one bit, n bit determination can also be possible.

Generally, a receiving clock is generated by a sort of phase feedback circuit, such as a phase tracking method or the like. FIG. 1A shows the phase tracking method. The phase tracking method circuit comprises a determination circuit (FF) 2201, a clock phase adjustment circuit 2202 and a phase detection circuit 2203. Data is inputted to the determination circuit 2201 and the phase detection circuit 2203, and the clock phase adjustment circuit 2202 reproduces a clock, based on the result of the phase detection. The reproduced clock is returned to the phase detection circuit 2203 and is used for subsequent clock phase adjustment. FIG. 1B shows such a binary determination waveform by a clock inputted to the determination circuit 2201. However, in the phase tracking method, although a clock with low jitters can be reproduced, the rapid fluctuation of a clock phase cannot be tracked.

In such a case, an over-sampling method with high tolerance against RF jitters included a clock can be used. In the over sampling method, decision is made at a rate sufficiently higher than a data rate, and one decided in an appropriate timing, of the results is selected later (decided and picked). Since the over-sampling does not include a feedback circuit for adjusting a clock phase, even a clock with high frequency jitters can be tracked.

FIG. 2A shows an over-sampling method circuit. The circuit comprises a determination circuit (FF) 2301, an over-sampling clock generation circuit 2302 and a data selection circuit 2303. The over-sampling determination circuit 2301 over-samples at a rate of approximately three to five times as much as a data rate. The clock generation circuit 2302 externally generates a reference clock for sampling data, using an external clock. The generated signal is transferred to the over-sampling determination circuit 2301. The data selection circuit 2303 selects and outputs data. FIG. 2B shows an over-sampling method binary determination waveform. Data is sampled by a plurality of clocks whose phases are shifted at equal intervals.

FIG. 3 shows another conventional over-sampling method circuit. The circuit comprises an over-sampling determination circuit 2401, a clock generation circuit 2402 and a data selection circuit 2403. The clock generation circuit 2402 externally obtains and generates a reference clock for sampling data, using an external clock. The generated signal is transferred to the over-sampling determination circuit 2401 and the data selection circuit 2403. The data selection circuit 2403 selects and outputs data. In this case, if the clock frequency of outputted data and the clock frequency of inputted data are not kept at an integral ratio, data overlaps or misses. Therefore, flow control is needed later.

In the over-sampling method disclosed by Japanese Patent Application Publication No. 2004-088386, skew correction is applied using a specific pattern signal. The edge of over-sampled data is statistically processed, the most stable edge is selected and appropriate data is reproduced by sampling data using the edge.

According to Japanese Patent Application Publication No. 2001-320353, no voltage controlled oscillator is used, and a phase control circuit and an analog delay-locked loop are used. The phase control circuit receives a fairly small number of clocks and controls the phases of a fairly small number of clocks. Then, the analog delay-locked loop develops the phase-controlled clocks up to number of phases needed for phase comparison. The clocks are supplied to a phase comparator. Thus, its jitter tolerance can be improved and a good clock can be generated.

According to Japanese Patent Application Publication No. H11-261409, the power consumption is reduced by stopping the useless operation in the locked state of an over-sampling method clock reproduction circuit. Japanese Patent Application Publication No. H10-313302 discloses phase control.

However, the over-sampling method and the clock/data reproduction circuit have the following problems. There is often a little difference between an internal clock frequency and the clock frequency of received data in signal transmission between devices and the like. In this case, in the over-sampling method, cyclical data overlap and missing occurs in data outputted from a receiving circuit. In order to cope with this, a sufficiently large buffer must be provided on the output side of the receiving circuit, and also flow control must be performed by a higher-order protocol. Such a flow control cannot be always realized by a communication protocol.

SUMMARY OF THE INVENTION

It is an object of the present invention to provide an over-sampling method clock/data reproduction circuit which is provided with high-speed tracking capability for jitters thanks to over-sampling and also in which no flow control is needed.

The data reproduction circuit in one aspect of the present invention, for receiving data and reproducing data/clock comprises an over-sampling determination circuit for sampling the received data by a clock with a frequency higher than the data rate of the received data, based on a first reproduced clock and converting it into digital signals, a data selection circuit with a circuit for selecting and outputting reproduced data by determining the digital signals generated by the over-sampling determination circuit in a timing based on the first reproduced clock, a phase error detection circuit for detecting a phase error from a timing difference between the reproduced data and the received data, based on the first reproduced clock and a circuit for outputting an adjustment signal in order to adjust its phase, based on the output of the phase error detection circuit and a clock generation circuit with a phase adjustment circuit in which the adjustment signal adjusts the phase of a second reproduced clock in a state at least immediately before the first reproduced clock and which generates the first reproduced clock and a circuit for supplying the first reproduced clock to the over-sampling determination circuit and the data selection circuit.

Preferably, the phase error detection circuit should comprise a phase/frequency error detection circuit with a circuit for detecting a frequency error from a timing difference between the reproduced data and the received data, based on the first reproduced clock, and the phase adjustment circuit should comprise a frequency adjustment circuit with a circuit for also adjusting the frequency error.

Preferably, the frequency adjustment circuit should comprise a phase interpolator and a digital filter for generating a weighting signal which controls the phase interpolator, based on the adjustment signal of the phase/frequency error detection circuit is provided.

The data reproduction circuit in one aspect of the present invention, for receiving data and reproducing data/clock comprises a first clock generation circuit for generating a clock for over-sampling data, based on a reference clock, an over-sampling determination circuit for sampling the received data, based on a clock with a frequency higher than the data rate of the received data, based on a clock generated by the first clock generation circuit and converting it into digital signals and a data selection circuit with a circuit for selecting and outputting the reproduced data by determining the digital signals generated by the over-sampling determination circuit in a timing based on the first reproduced clock, a phase/frequency error detection circuit for detecting a phase error and a frequency error from a timing difference between the reproduced data and the received data, based on the first reproduced clock and a circuit for outputting a signal for adjusting its phase and frequency, based on the output of the phase/frequency error detection circuit, and a second clock generation circuit with a frequency adjustment circuit in which the adjustment signal reflects the phase adjustment of a second reproduced clock in a state at least immediately before the first reproduced clock and the adjustment of the frequency error and which generates the first reproduced clock and a circuit for supplying the fist reproduced clock to the over-sampling determination circuit and the data selection circuit.

Preferably, the frequency adjustment circuit should comprise a phase interpolator, and a digital filter for generating a weighting signal for controlling the phase interpolator, based on the adjustment signal of the phase/frequency error detection circuit is provided.

The data reproduction circuit in one aspect of the present invention, for receiving data and reproducing data/clock comprises a clock generation circuit for generating a clock for over-sampling the received data, based on a reference clock, an over-sampling determination circuit for sampling the received data by a clock with a frequency higher than the data rate of the received data and converting it into digital signals, a data selection circuit with a circuit for selecting and outputting the reproduced data by determining the digital signals generated by the over-sampling determination circuit, based on the first reproduced clock and a circuit for generating a signal for controlling a second reproduced clock for generating the first reproduced clock, a clock selection circuit for selecting the second reproduced clock by the clock supplied by the clock generation circuit and the control signal and a PLL circuit for reducing the jitters of the second reproduced clock and generating the first reproduced clock.

Preferably, the PLL should be an injection-lock PLL with an injection locking VCO.

Preferably, the PLL should be externally provided with the VCO. The VCO can also be VXCO using a crystal oscillation circuit.

The data reproduction circuit in one aspect of the present invention, for receiving data and reproducing data/clock comprises a determination clock generation circuit for generating a clock for over-sampling the received data, based a reference clock, an over-sampling determination circuit for sampling the received data by a clock with a frequency higher than the data rate of the received data, based on the sample clock generated by the determination clock generation circuit and converting it into digital signals, a writing control circuit for adjusting the timing of the sample clock from the determination clock generation circuit, a first selector circuit for writing and controlling the digital signals into a plurality of buffers, based on the output of the writing control circuit, a second selector circuit for reading the digital signals from the buffers by a reading signal which selects the digital signals, a data selection clock generation circuit for generating a reproduced clock for reproducing the data, a reading control circuit for controlling the reading signal, based on the reproduced clock generated by the data selection clock generation circuit and a data selection circuit for selecting and outputting the reproduced data by determining a timing based on the reproduced clock.

Preferably, the phase error detection circuit should detect data change point, based on the over-sampled data and the first reproduced clock, generates a phase signal from the change point, convert the operation of the phase signal into a pointer signal and output the pointer signal as an adjustment signal for adjusting its phase.

Preferably, the data selection circuit should perform a pipeline process.

Preferably, the adjustment signal should be generated by a charge pump and a loop filter.

Preferably, the frequency/phase error detection circuit should detect the data change point, based on the over-sampled data and the first reproduced clock, generate a phase signal from the change point, convert the operation of the phase signal into a pointer signal, further generate a signal for adjusting its frequency from the pointer signal and output it as an adjustment signal for adjusting its phase, together with the pointer signal.

Preferably, the data selection circuit should perform a pipeline process.

Preferably, the adjustment signal should be generated by a charge pump and a loop filter.

Preferably, the frequency/phase error detection circuit should detect the data change point, based on the over-sampled data and the first reproduced clock, generate a phase signal from the change point, convert the operation of the phase signal into a pointer signal, further generate a signal for adjusting its frequency from the pointer signal and output it as an adjustment signal for adjusting its phase, together with the pointer signal.

By adopting such a configuration, detecting phase/frequency errors of phase and feeding it back to the frequency of a determination clock, input data and a sampling clock can be kept at an integral ratio. As a result, there are no overlap and missing in output obtained by over-sampling data, and there is no need for flow control.

According to the present invention, high jitter tracking capability can be obtained in over-sampling determination and also there is no need for flow control in a higher-order layer. There is no need for buffer memory for enabling flow control, thereby reducing the amount of hardware. A signal generated to adjust phase/frequency, based on a frequency/phase error can be easily generated in a control circuit for over-sampling, thereby reducing its cost increase to a minimum.

BRIEF DESCRIPTION OF THE DRAWINGS

FIG. 2A shows the conventional over-sampling method. FIG. 2B shows an over-sampling method circuit and an over-sampling method binary determination waveform, respectively.

FIG. 11 shows the phase generation control circuit.

FIG. 13 explains the pointer of its detection circuit.

FIG. 14 shows the pointer generator.

FIGS. 16A, 16B and 16C show another pointer generator.

FIG. 19 is the functional block diagram of the second preferred embodiment.

FIG. 25 shows the configuration of the fourth preferred embodiment.

FIG. 27 shows the configuration of the sixth preferred embodiment.

DESCRIPTION OF THE PREFERRED EMBODIMENTS

Figures 4A, 4B:
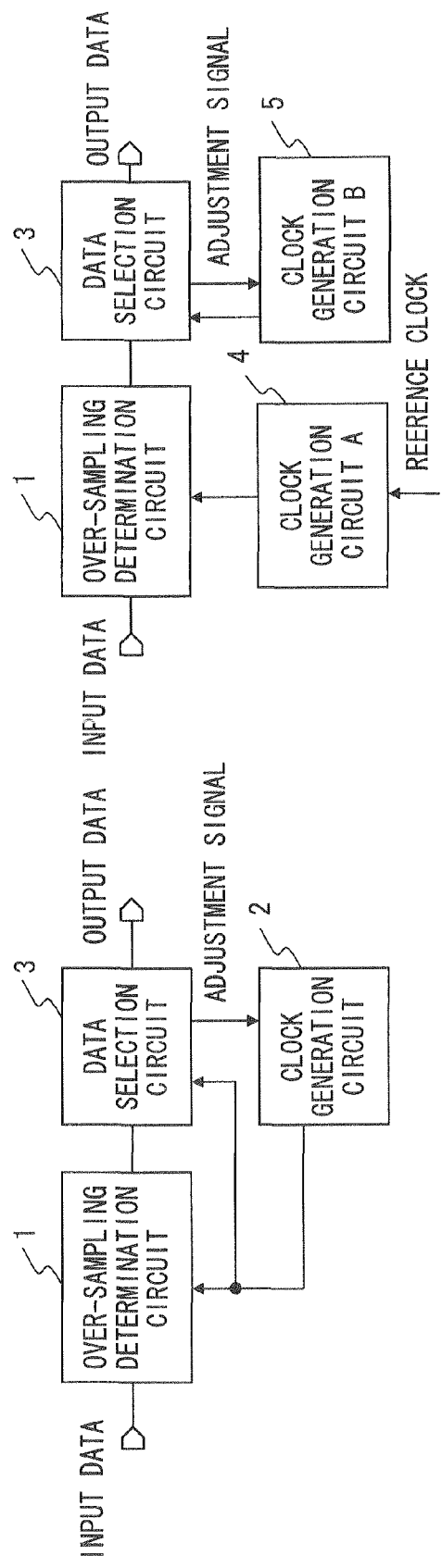
FIGS. 4A and 4B show the basic configurations of the present invention.

The preferred embodiments of the present invention are described in detail below with reference to the drawings. FIGS. 4A and 4B show the basic configurations of the present invention. FIG. 4A comprises an over-sampling determination circuit 1, a clock generation circuit 2 and a data selection circuit 3. FIG. 4B comprises an over-sampling determination circuit 1, a clock generation circuit A4, a clock generation circuit B5 and a data selection circuit 3.

According to the configuration shown in FIG. 4A, the phase/frequency errors and the like of input data and a sampling clock are detected and an adjustment signal is generated. Based on the adjustment signal, a clock frequency according to the size of a frequency difference is fed back. Using the clock, over-sampling is conducted.

According to the configuration shown in FIG. 4B, the phase/frequency errors and the like of input data and a sampling clock are detected and an adjustment signal is generated. Based on the adjustment signal, a clock frequency according to the size of a frequency difference is fed back to the data selection circuit 3. The over-sampling determination circuit 1 receives a clock from the clock generation circuit A4 using a reference clock and conducts over-sampling.

Adopting such a method, input data (received data) and a sampling clock can be kept at an integral ratio. As a result, output obtained by over-sampling has neither overlapping nor missing and there is no need for flow control.

In this case, a normal phase-locked loop in which not only a frequency difference but also a phase difference are detected and fed back to a clock phase can also be used.

Whether or not flow control is needed depends on whether or not the frequency of data outputted from the data selection circuit and the frequency of the input data are kept at an integral ratio. As long as the frequency of data output and the frequency of input data are kept at an integral ratio, the frequency of over-sampling is not directly connected with whether or not flow control is needed. Therefore, by controlling the phase of only the clock of the data selection circuit, the frequency of data output and the frequency of input data can be kept at an integral ratio, as shown in FIG. 4.

Figure 5:
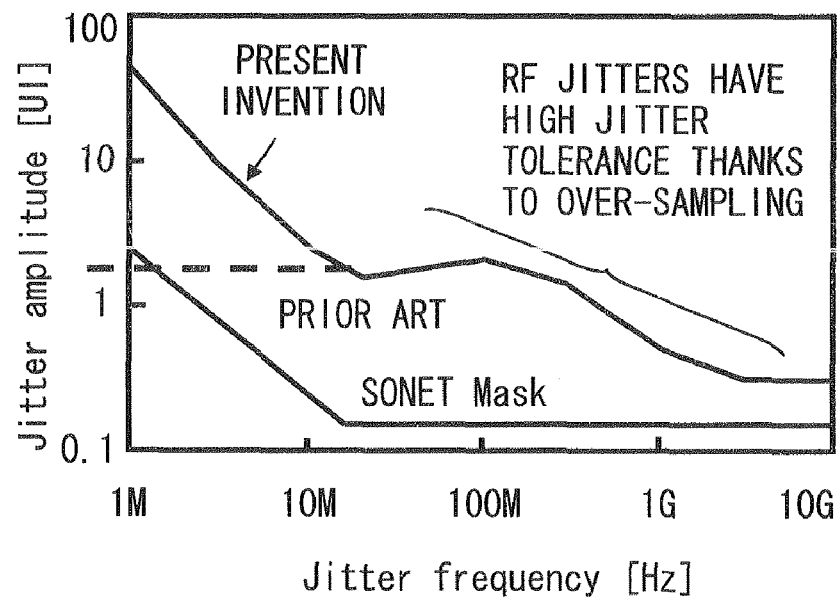
FIG. 5 shows the effect of the present invention.

FIG. 5 shows the jitter tolerance of the present invention. Jitter tolerance is defined as the peak-to-peak amplitude of sinusoidal jitters applied to the input signal in such a way as to cause 1 dB power penalty.

FIG. 5 shows the result of a stress test for confirming that no penalty is added under the rated operational condition of the transfer speed of synchronous optical network (SONET).

In FIG. 5, the vertical and horizontal axes indicate jitter amplitude (UI) and jitter frequency (HZ). Jitter means dynamic displacement from the long-time average position of a digital signal edge, and is indicated by unit interval (UI) 1 UI is 1 bit cycle. The jitters of input data is caused by the dynamic phase error of the sampling edge of a reproduced clock, and the jitters of the reproduced clock cause jitters in timing-adjusted data. Jitter tolerance is the allowance of some frequency fluctuation due to temperature and circuit characteristic of a clock frequency on the receiving side and transmitting data or clock frequency.

Figures 1A, 1B:
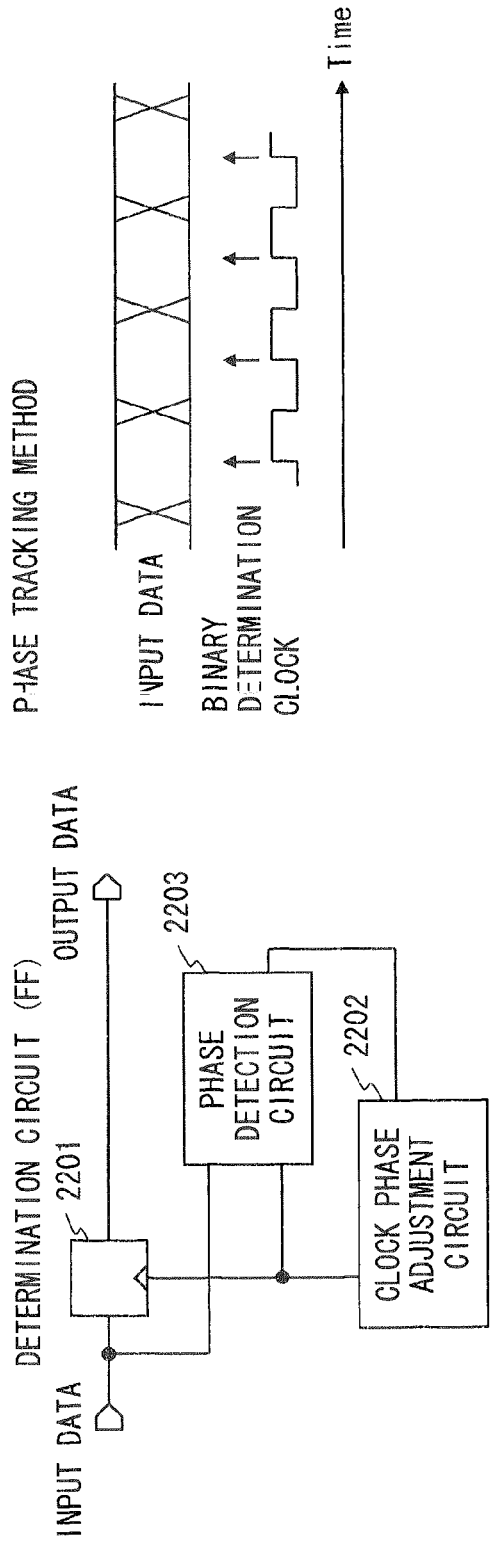
FIG. 1A shows the conventional phase tracking method.
FIG. 1B shows a phase tracking method circuit and a phase tracking method binary determination waveform, respectively.
Figure 3:
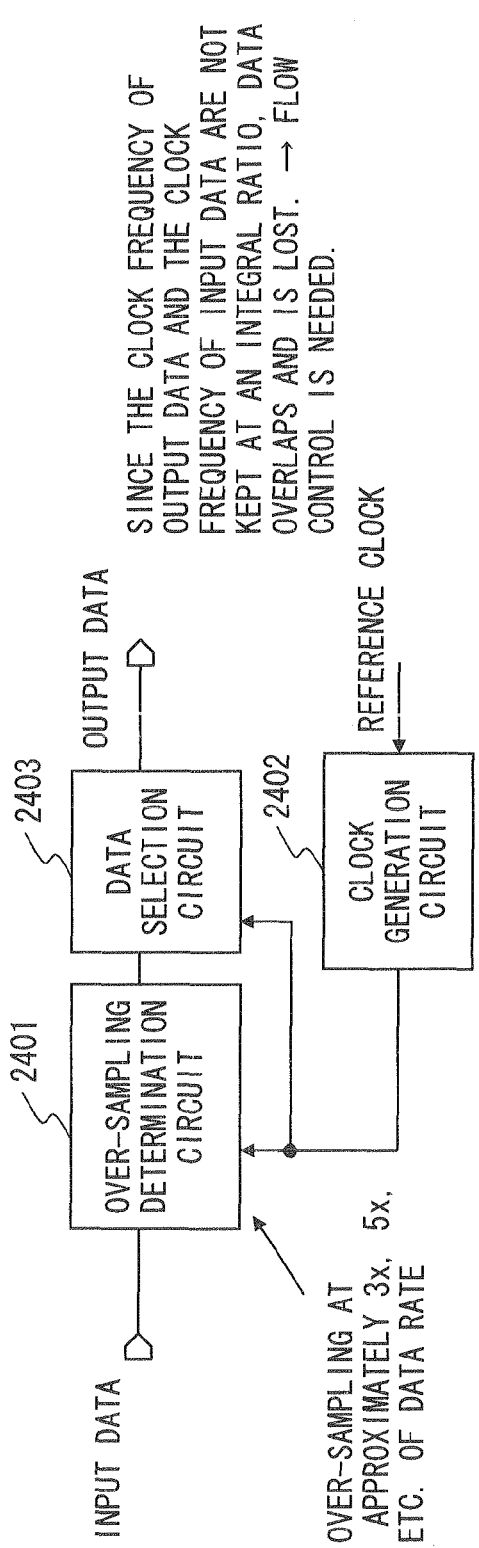
FIG. 3 shows a conventional configuration.

This is the comparison result of jitter tolerance between the conventional configurations shown in FIG. 3 and the configuration shown in FIG. 18, which will be described later. The jitter becomes ten times and twice (100 MHz~10 GHz) as much as a conventional SONET mask (1 MHz~100 MHz), and RF jitters has jitter tolerance thanks to over-sampling. The configuration of the present invention is described in more detail below.

The First Preferred Embodiment

Figure 6:
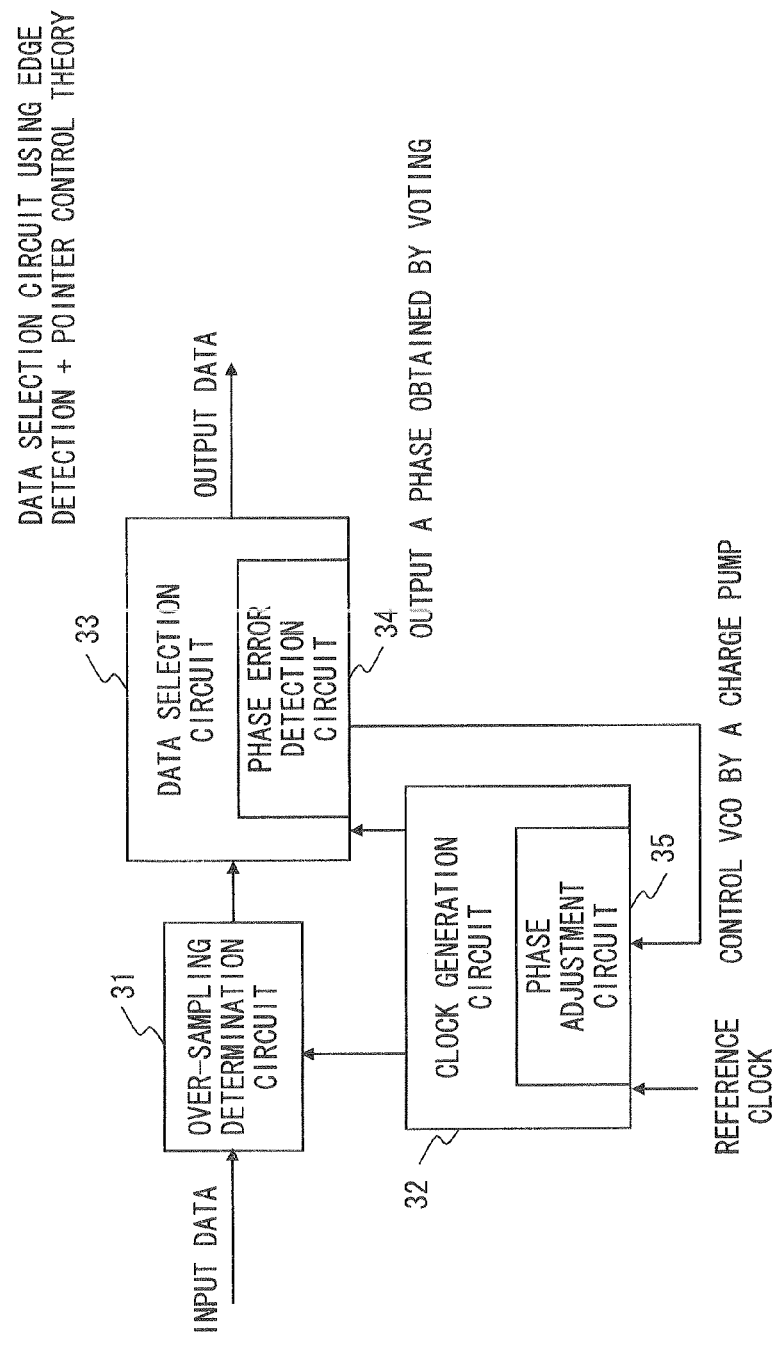
FIG. 6 shows the configuration of the first preferred embodiment.

FIG. 6 shows the configuration of the preferred embodiment whose basic configuration is shown in FIG. 4A. An over-sampling method clock and data recovery (CDR) circuit of the first preferred embodiment comprises an over-sampling determination circuit 31, a clock generation circuit 32 and a data selection circuit 33. The clock generation circuit 32 comprises a phase adjustment circuit 35. The data selection circuit 33 comprises a phase error detection circuit 34.

The phase error detection circuit 34 outputs a phase obtained by voting.

The phase adjustment circuit 35 controls a voltage-controlled oscillator (VCO) by a charge pump.

The CDR circuit receives, for example, serial non-return-to-zero (NRZ) data by the over-sampling determination circuit 31 as input data.

The received input data is sampled by a clock (the first reproduced clock) transferred from the clock generation circuit 32 and is transferred to the data selection circuit 33. The data selection circuit 33 outputs data. Simultaneously, the phase error detection circuit 34 detects a phase error and outputs the result of the detection. The phase error detection result is processed and is inputted to the clock generation circuit as an adjustment signal. The phase adjustment circuit 35 adjusts a clock (the second reproduced clock), based on the phase error detection result and the first reproduced clock is again outputted from the clock generation circuit 32 to the over-sampling determination circuit 31 and the data selection circuit 33.

Next, the operation of the first preferred embodiment is described with reference to FIG. 7. In this example, the sampling determination circuit 41 determines the binary of input data, using a frequency three times as much as the data rate (40 Gbits/second). Therefore, 12 determination circuits for performing binary determination, using a 10 GHz toggle frequency are used to supply 12-phase 10 GHz multi-phase clock from the clock generation circuit 45 to the over-sampling determination circuit 41(31).

5 GHZ 24-bit/second data obtained in the over-sampling determination circuit 41 is converted into 2.5 GHz 48-bit parallel data by the demultiplexer (DEMUX) 42 of the data selection circuit 33 and is inputted to the data clock reproduction circuit 43 of the data selection circuit 33. The data/clock reproduction circuit 43 incorporates the phase error detection circuit 34 shown in FIG. 6, for detecting input data and the phase error of a reproduced clock for driving the data/clock reproduction circuit 43, and outputs the detected phase error result (error signal; in this example, the phase error result is a control signal being almost DC voltage which varies depending on a loop filter 44). The VCO control voltage is fed back to the clock generation circuit 45 (10 GHzVCO). The clock generation circuit 45 outputs a reproduced clock phase-adjusted, based on the phase error detection result. The reproduced clock generated at this moment can be multi-phased.

The reproduced clock is inputted to the over-sampling determination circuit 41 and the data/clock reproduction circuit 43. To the data/clock reproduction circuit 43, the reproduced clock is inputted in order to regenerate the output data shown in FIG. 7(2).

Figure 8:
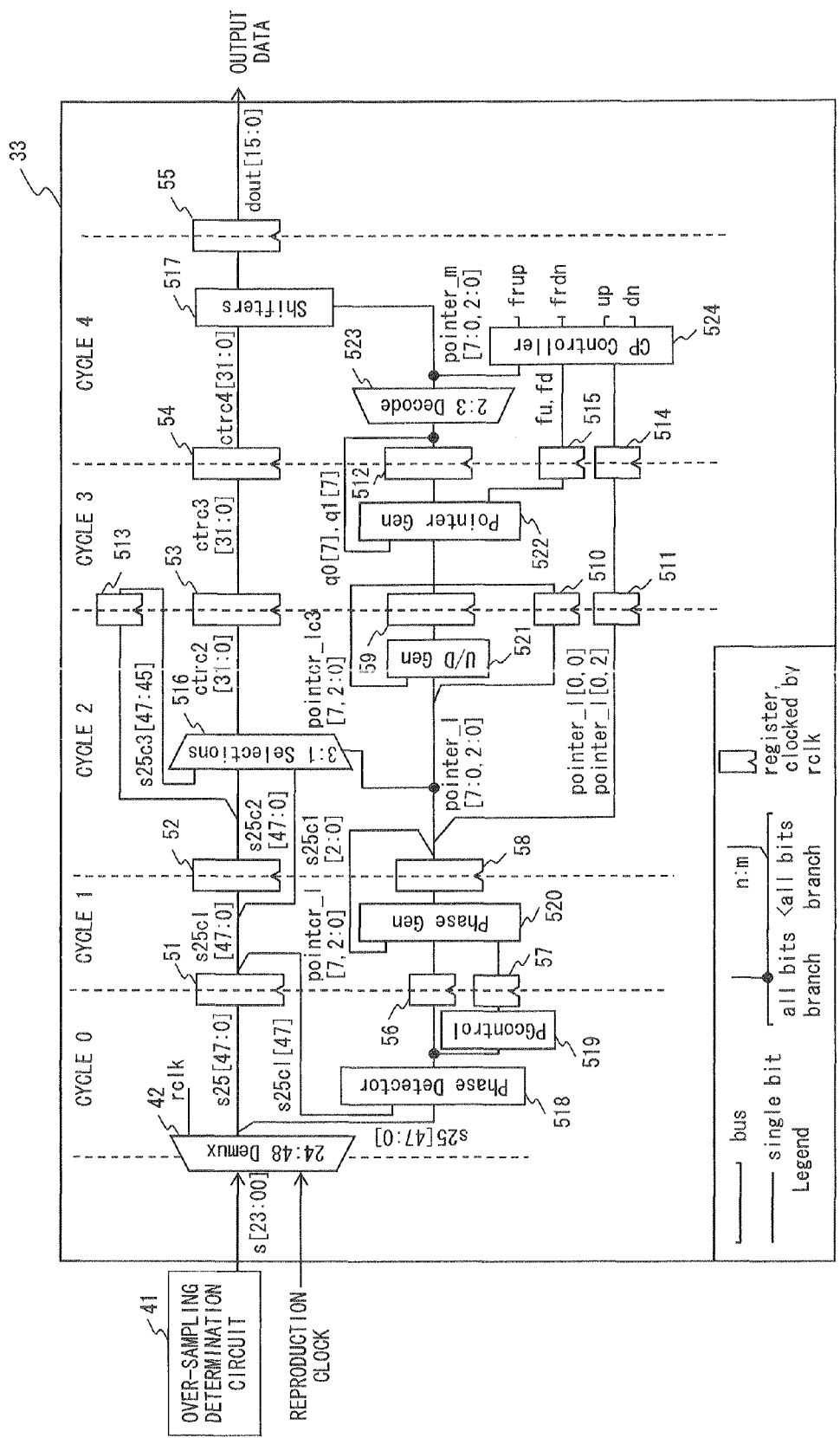
FIG. 8 shows the data selection circuit.

FIG. 8 shows an example of the data selection circuit 33. The data selection circuit 33 comprises a demultiplexer 42, registers 51-59 and 510-515, a selector 516, a shifter 517, a phase detector 518, a phase generation control 519, a phase generator 520, an up/down (U/D) generator 521, a pointer generator 522, a decoder 523, a charge pump controller 524, a charge pump 525 and a loop filter 44. In the first preferred embodiment, the function of the register 515 and the functions of FrUP and FrDN port of the charge pump controller 524 are not used. The charge pump 525 and the loop filter 44 are not shown in FIG. 8.

Figure 7:
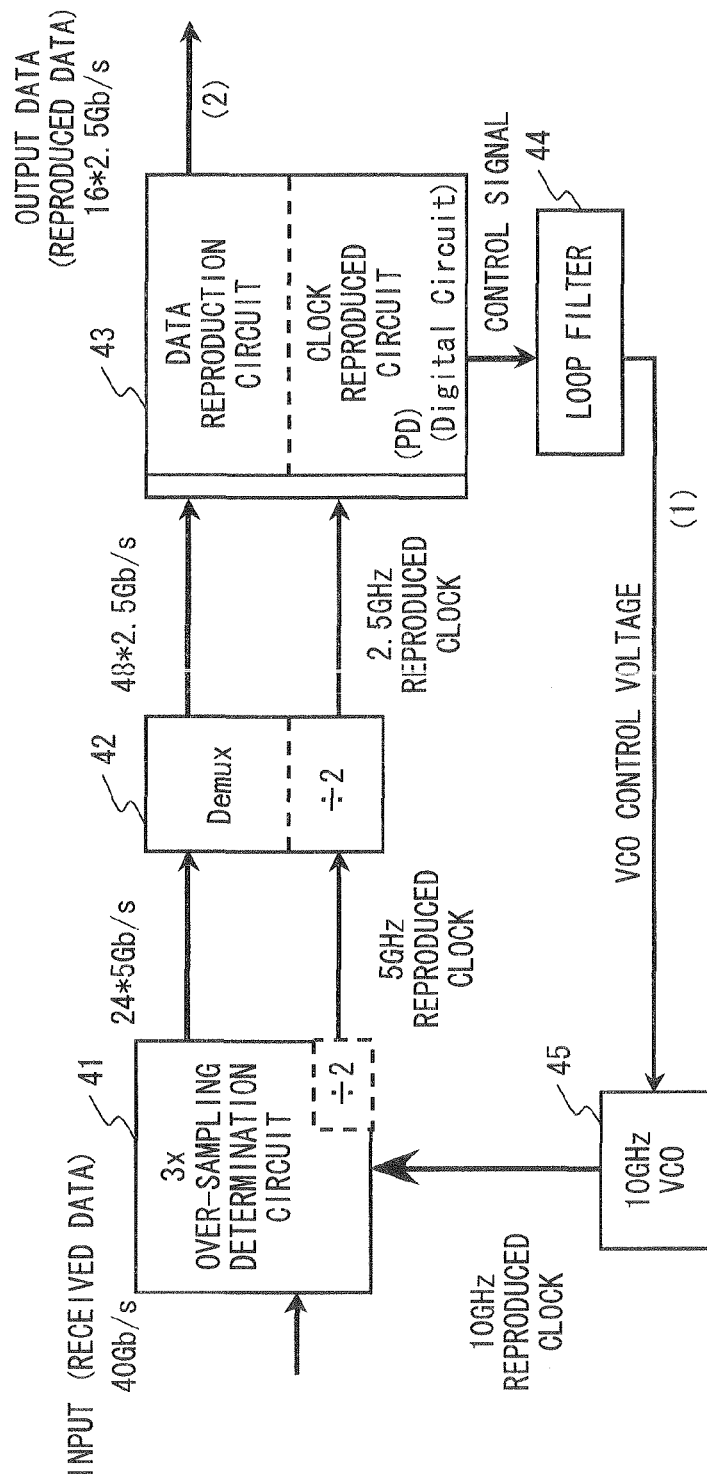
FIG. 7 is the functional block diagram of the first preferred embodiment.

In the demultiplexer 42, data inputted from the over-sampling determination circuit 41 is converted from 5 Gbits/second with 24-bit width into 2.5 Gbits/second with 48-bit width, together with a reproduced clock converted from 24 GHz into 48 GhZ, as shown in FIG. 7.

The data reproduction circuit of the data/clock reproduction circuit 43 synchronizes output S25 (in this example, S25[47:0]; signal transmitted with 48 bits of bus width) from the demultiplexer 42 with registers 51-55 in cycles 0-4 (in this example, in a 5-step pipeline process), using a reproduced clock. In cycle 2, S25c1[2:0] in cycle 1, S25c3[47:45] in the register 513 of cycle 3 and S25c2[47:0] in cycle 2 are inputted to a selector 516, and data ctrc2[31:0] with 32-bit width is generated based on data, pointer_l[7:0,2:0] in the cycle 2 of a phase generator 520, which will be described later.

In cycle 4, data with 16-bit width (dout[15:0]) is outputted based on ctrc4[31:0] and pointer_m[7:0, 2:0], which will be described later.

Figure 9A:
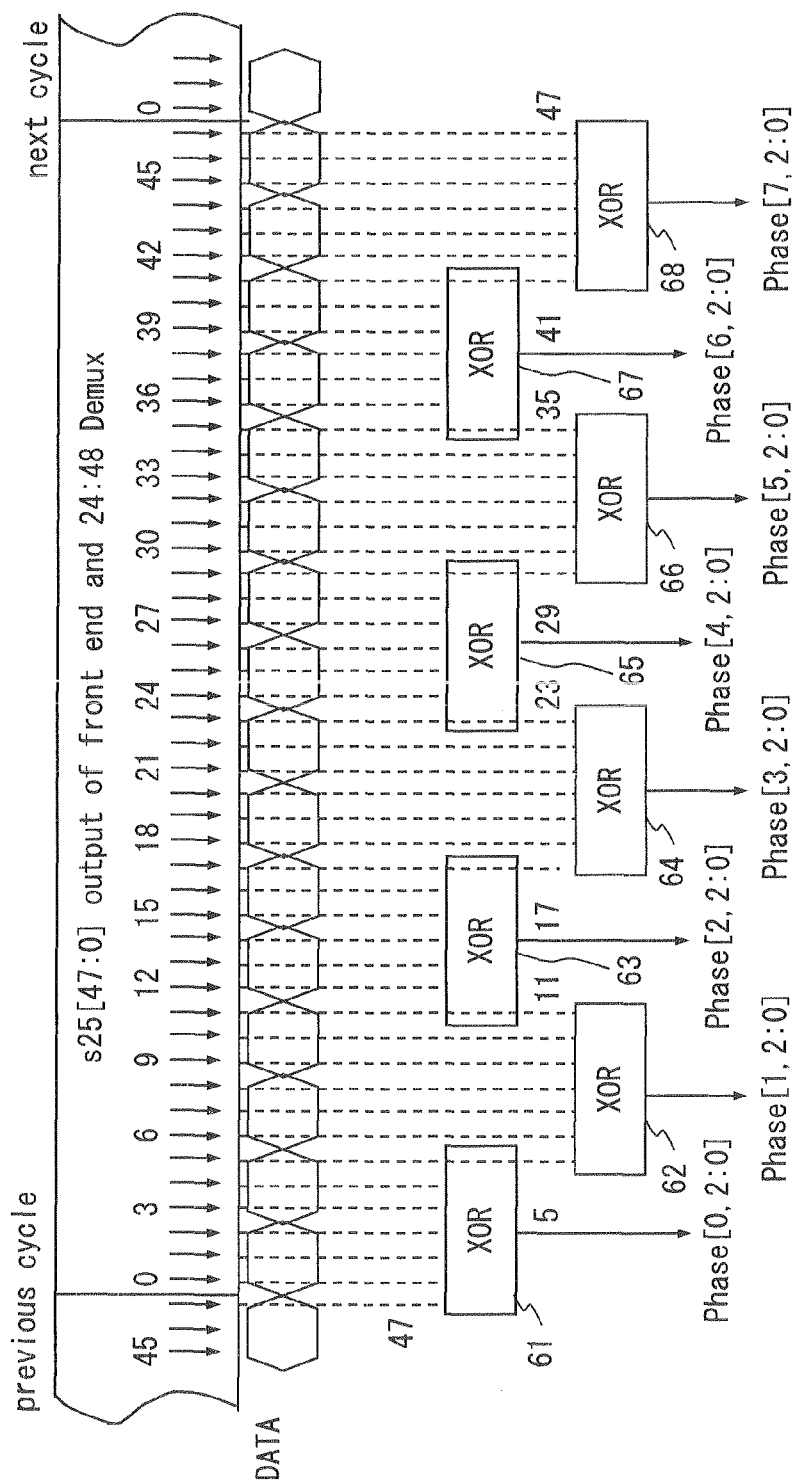
FIGS. 9A and 9B show the phase detection circuit.

In cycle 0, the clock reproduction circuit inputs the output S25[47:0] of the demultiplexer 42 and the output S25c1[47:0] of the register 51 in cycle 1 to a phase detector 518. FIG. 9 shows an example of the phase detector 518. In FIG. 9A, a phase error is detected by an edge detection circuit. XOR circuits 61-68 are provided at intervals of 6 bits in correspondence with S25[47:0]. For example, the XOR circuit 61 processes 47 bits in the previous cycle and the current 0-4 bits, the XOR circuit 62 processes 5-11 bits, the XOR circuit 63 processes 12-16 bits, the XOR circuit 64 processes 17-23 bit, the XOR circuit 65 processes 24-28 bits, the XOR circuit 66 processes 29-35 bits, the XOR circuit 67 processes 36-40 bits and the XOR circuit 68 processes 41-47 bits. Thus, an edge (the change point of data) included 48 bits is detected.

Figure 9B:
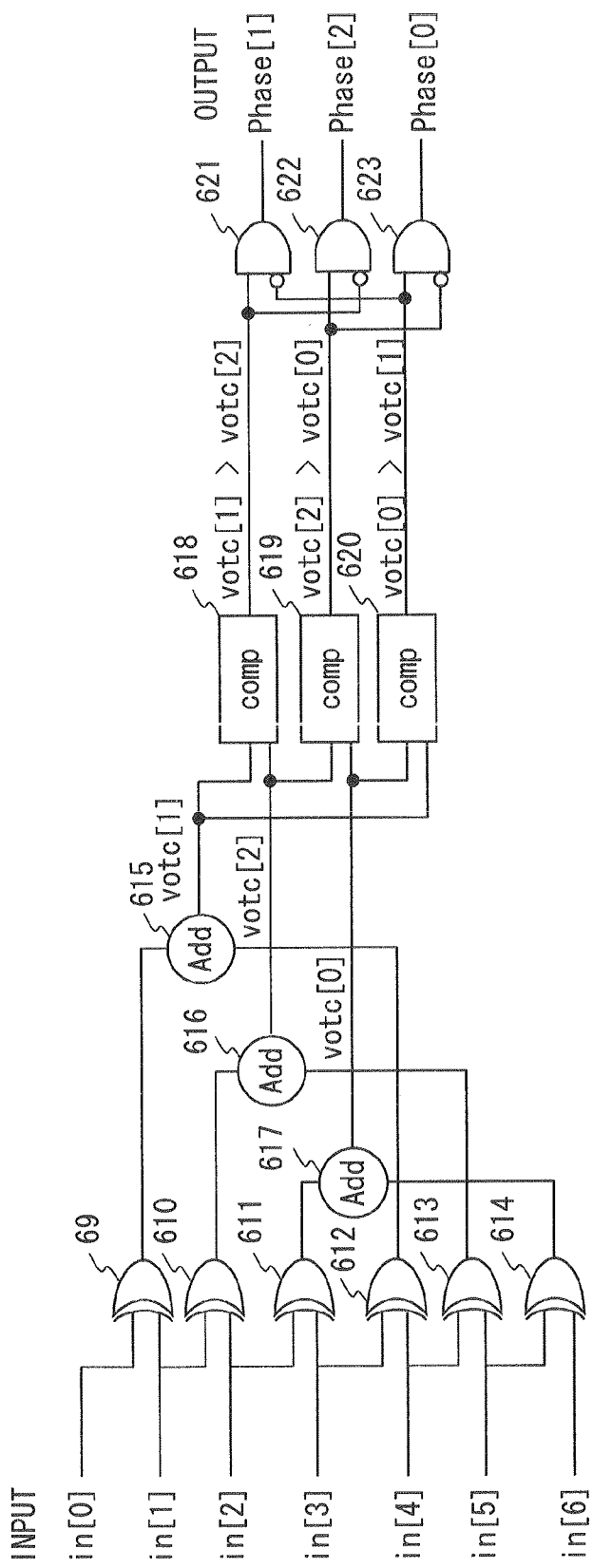

FIG. 9B shows the internal configuration of the XOR circuit. Input ports in[0]-in[6] for 7 bits as input are provided. A plurality of pieces of sample data is inputted to EX-ORs 69-614. The plurality of pieces of sample data is compared and their differences are detected. The result is inputted to add 615-617. The outputs of the EX-ORs 69 and 612 are inputted to the add 615, the outputs of EX-ORs 610 and 613 are inputted to the add 616, and the outputs of the EX-ORs 611 and 614 are inputted to the add 617. Each of the adds 615-617 sums the outputs of the two EX-ORs and outputs the sum (add is logical OR).

Comp 618 compares the output votc[1] of the add 615 with the output votc[2] of the add 616, and if votc[1] >votc[2], its output is made high. Comp 619 compares the output votc[2] of the add 616 with the output votc[0] of the add 617, and if votc[2] >votc[0], its output is made high. Comp 620 compares the output votc[0] of the add 617 with the output votc[1] of the add 615, and if votc[0] >votc[1], its output is made high. The results are inputted to AND 621-623.

To the AND 621, the output of the comp 618 and the inverted output of the comp 620 are inputted, and are outputted as phase[1]. To the AND 622, the output of the comp 619 and the inverted output of the comp 621 are inputted, and are outputted as phase[2]. To the AND 623, the output of the comp 620 and the inverted output of the comp 619 are inputted and are outputted as phase[3]. The result of each XOR circuit is transferred to the phase generation control 519 and the register 56 in cycle 0 and is transferred to the phase generator 520 in cycle 1. One of phases [0], [1] and [2] of the phase signals {phase[0,2:0]-phase[7,2:0]} indicates an output obtained by sampling the center of the eye pattern shown in FIG. 9A.

The phase generation control 519 generates the control signal of the phase generator 520, based on the phase signal (phase[7:0,2:0]) in cycle 1 and transfers it to the register 57.

Then, the phase generator 520 generates a signal, pointer_l (pointer_l[7:0,2:0]), based on the phase signal being the output of the register 56 and the output pointer_l[7,2:0] of the phase generator 520 being the output of the register 58 in cycle 2.

Figure 10:
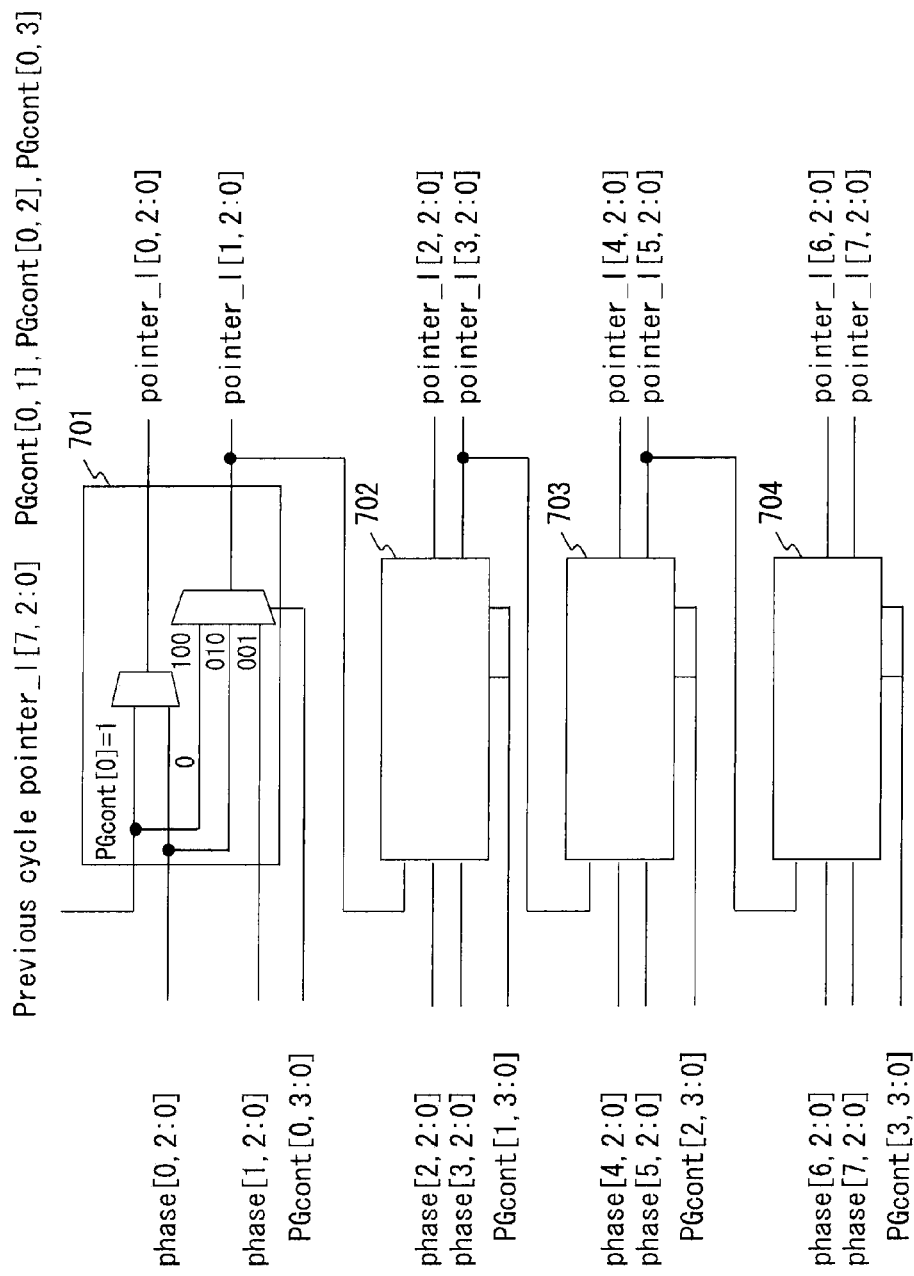
FIG. 10 shows the phase generator.

FIG. 10 shows an example of the phase generator 520. The phase generator 520 has four blocks. To a block 701, phase [0,2:0], phase[1,2:0], pointer_l[7,2:0] in the immediately previous cycle and the output PGcont [0, 3:0] of the phase generation control 519 are inputted. If PGcont[0] =1, pointer_l [7,2:0] in the immediately previous cycle is outputted to pointer_l[0,2:0]. PGcont[0,1], PGcont[0,2] and PGcont[0,3] of PGcont[0,3:0] are "100", the pointer_l[7,2:0] in the immediately previous cycle is selected and is outputted to pointer_l [1,2:0]. If they are "010", the phase[0,2:0] is selected and is outputted to the pointer_l[1,2:0]. If they are "001" [1,2:0], the phase[1,2:0] is selected and is outputted to the pointer_l[1,2:0].

To a block 702, phase[2,2:0], phase[3,2:0], the output pointer_l[1,2:0] of the block 701 and the output PGcont[1,3:0] of the phase generation control 519 are inputted. Pointer_l [2,2:0] and pointer_l[3,2:0] are outputted according to the logic shown in the block 701.

To a block 703, phase[4,2:0], phase[5,2:0], the output pointer_l[3,2:0] of the block 701 and the output PGcont[2,3:0] of the phase generation control 519 are inputted. Pointer_l [4,2:0] and pointer_l[5,2:0] are outputted according to the logic shown in the block 701.

To a block 704, phase[6,2:0], phase[7,2:0], the output pointer_l[5,2:0] of the block 701 and the output PGcont[3,3:0] of the phase generation control 519 are inputted. Pointer_l [6,2:0] and pointer_l[7,2:0] are outputted according to the logic shown in the block 701.

The phase generation control 519 performs the operation shown in FIG. 11. The phases[0,2:0] and [1,2:0] are paired, the phases[2,2:0] and [3,2:0] are paired, the phases[4,2:0] and [5,2:0] are paired the phases[6,2:0] and [7,2:0] are paired, and they are inputted to blocks 801-804, respectively.

For example, to the block 801, phase[2i,0], phase[2i,1] phase[2i, 2], phase[2i+1,0], phase[2i+1,1] and phase[2i+1,2] are inputted (i=0-3). An output obtained by applying NOR to the phase[2i,0], phase[2i,1] and phase[2i,2] is specified as PGcont[i,0]. An output obtained by applying NOR to the phase[2i+1,0], phase[2i+1,1] and phase[2i+2,2] and inverting it is specified as PGcont[i,3].

PGcont[i,1] can be obtained by applying AND to the PGcont[i,0] and PGcont[i,3] before inversion. PGcont[i,2] can be obtained by applying AND to inverted PGcont[i,0] and PGcont[i,3] before inversion. Such an operation is also performed in each of the blocks 802-804.

Then, pointer_l[7:0,2:0] and the pointer_lc3[7,2:0] of the register 510 in cycle 3 are inputted to a U/D generator 521 and a register 510. Pointer_l[0,0] and [0,2] are inputted to a register 511.

Figure 12:
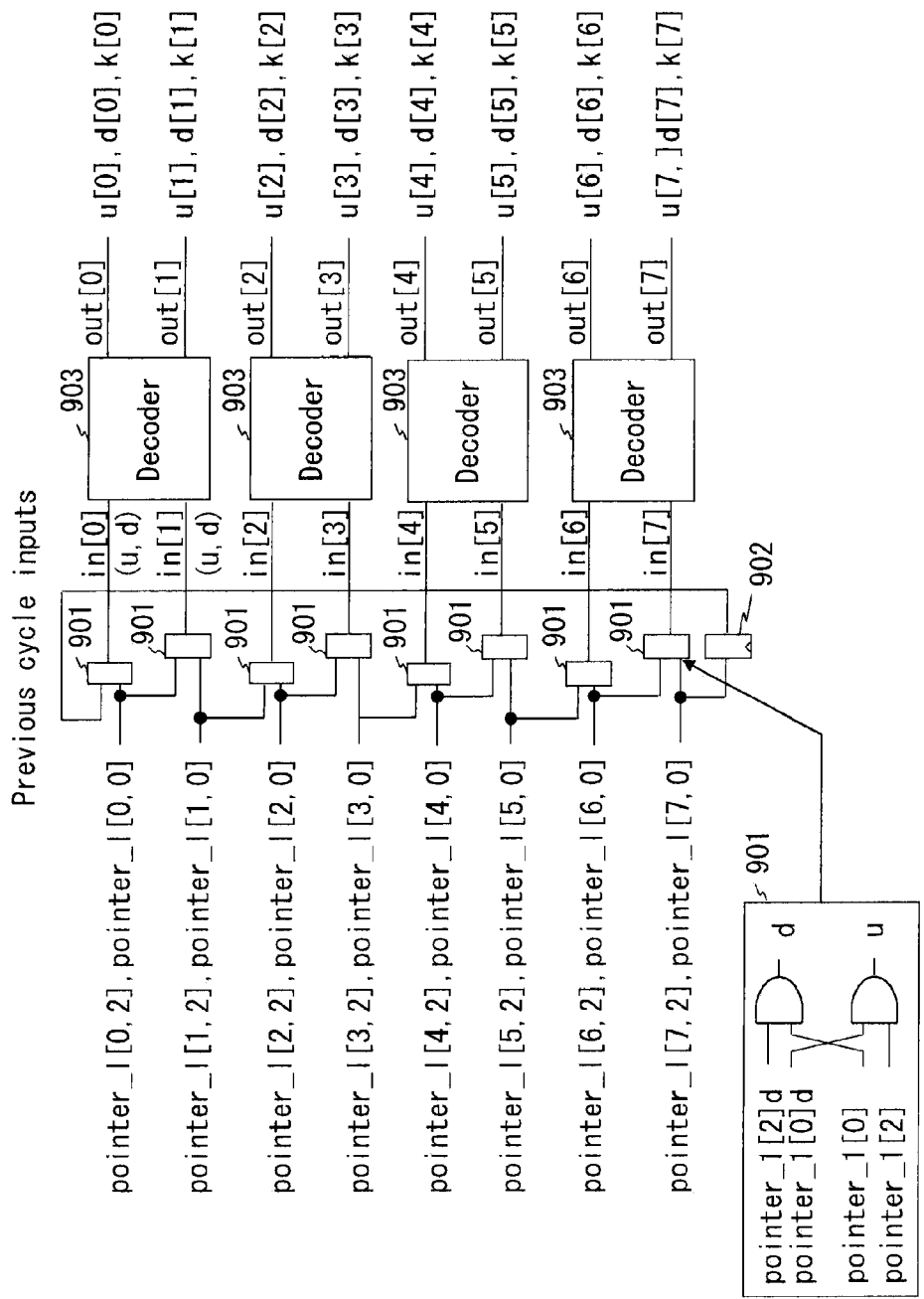
FIG. 12 shows the U/D generator.

The U/D generator 521 calculates u[0]-[7], d[0]-[7] and k[0]-[7] by the circuit shown in a block 901 and the circuit shown in a block 903 of FIG. 12. For example, when pointer_l [0,2], pointer_l[0,0], pointer_l[7,2] and pointer_l[7,0] are inputted to the block 901, u and d are outputted according to the logic indicated by the two AND circuits. Pointer_l[0,2], pointer_l[0,0], pointer_l[1,2] and pointer_l[1,0] are inputted to each block and its output is calculated. Pointer_l[1,2], pointer_l[2,0], pointer_l[2,2] and pointer_l[2,0] are inputted to each block and its output is calculated. Pointer_l[2,2], pointer_l[2,0], pointer_l[3,2] and pointer_l[3,0] are inputted to each block and its output is calculated. Pointer_l[3,2], pointer_l[3,0], pointer_l[4,2] and pointer_l[4,0] are inputted to each block and its output is calculated. Pointer_l[4,2], pointer_l[4,0], pointer_l[5,2] and pointer_l[5,0] are inputted to each block and its output is calculated. Pointer_l[6,2], pointer_l[6,0], pointer_l[7,2] and pointer_l[7,0] are inputted to each block and its output is calculated.

Then, data (composed of u and d) in in[0]-in[7] is inputted to the block 903. If u is larger than d in in[0] and in[1], "up" is asserted. If d is larger than u, "down" is asserted. If u and d are equal, the current state is maintained. For example, if out[0] is "up", u[0] is made valid. If out[0] is "down", d[0] is made valid. If the current state is maintained, k[0] is made valid.

The same process is applied to all blocks, and as shown in FIG. 12, u[0]-u[7], d[0]-d[7] and k[0]-k[7] are determined. Then, the outputs u, d and k of the U/D generator 521 are inputted to the register 59. Out[0] is composed of u[0], k[0] and d[0], out[1] is composed of u[1], k[1] and d[1], . . . and out[7] is composed of u[7], k[7] and d[7].

FIG. 13 shows the relationship between a pointer code and a sample to be selected. If a signal, pointer_l changes 2→1→0→2, in FIG. 13, the arrow of the pointer moves upward to indicate the current position. If the signal, pointer_l moves conversely, the position shifts downward. If pointer_m [0]=1 and pointer_m[1]=pointer_m[2]=0, pointer_m=0. If pointer_m[1]=1 and pointer_m[0]=pointer_m[2]=0, pointer_m=1. If pointer_m[2]=1 and pointer_m[0]=pointer_m[1] =0, pointer_m=2.

The up/down shifter 1106 of the pointer generator 522 shown in FIG. 14 generates a signal, pointer_m. Shifters 1106 are cascade-connected as in the phase detector 518. This shifter 1106 is driven by eight sets of three signals of u, d and k. The signals u, d and k are generated by the U/D generator 521 as described above.

The U/D generator 521 is a simple logic circuit, and compares a signal, pointer_l with a signal, pointer_l in the immediately previous cycle. If as a result, u is valid, the frequency of the reproduced clock (the clock output of the VCO) must be increased. If d is valid, the frequency of the reproduced clock (the clock output of the VCO) must be reduced. If k is valid, the current state is maintained.

Figure 15:
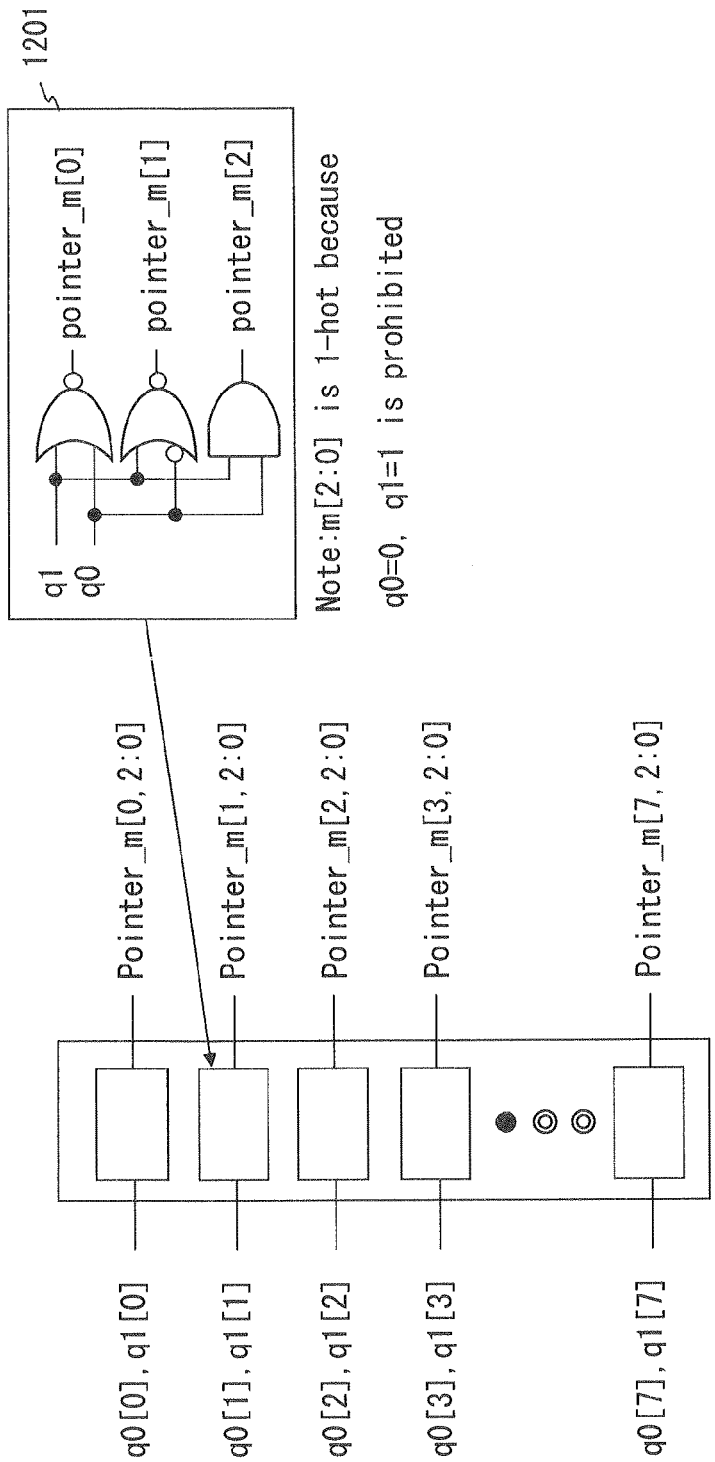
FIG. 15 shows the decoder.

The U/D generator 521 monitors the transitions between pointer_l[0] and pointer_l[2]. Since 0-to-2 transition in the same direction never happens in adjacent 2UI periods, u, d and k are generated. Pointer_m (upper code (m) in FIG. 13) selects one from three positions (0,1 and 2) in the shifter 1106 (the selected 0, 1 or 2 is indicated, for example, by two bits). The q0 and q1 in FIG. 14 are inputted to a 2-to-3 decoder 523 shown in FIG. 15 and are converted by the logic circuit 1201 shown in FIG. 15, into pointer_m[0], pointer_m[1] and pointer_m[2]. In this case, if q0=0 and q1=1, they are prohibited.

FIGS. 16A and 16B show the transitions of the input/output of q0 and q1. FIG. 16A shows the transitions of q0 and q1. They transit as shown in FIG. 16B. In this case, the starting point of an arrow in FIG. 16A indicates out_q0, out_q1 or input in FIG. 16B. FIG. 16C shows an actual circuit which can realize it.

The pointer generator 522 comprises a circuit for detecting the cycle slip of the clock of the VCO 45 and data clock. The circuit shown in FD1105 of FIG. 14 detects frequencies.

In cycle 3, the output of the register 59 and the q0[7] and q1[7] of the register 512 are inputted to the pointer generator 522 and its output is inputted to the register 512.

In cycle 4, the data of the register 512 is inputted to the decoder 523 to generate pointer_m[7:0,2:0], which is inputted to the charge pump controller 524 together with the pointer_l[0,0] and [0,2] of the register 514.

Figure 17:
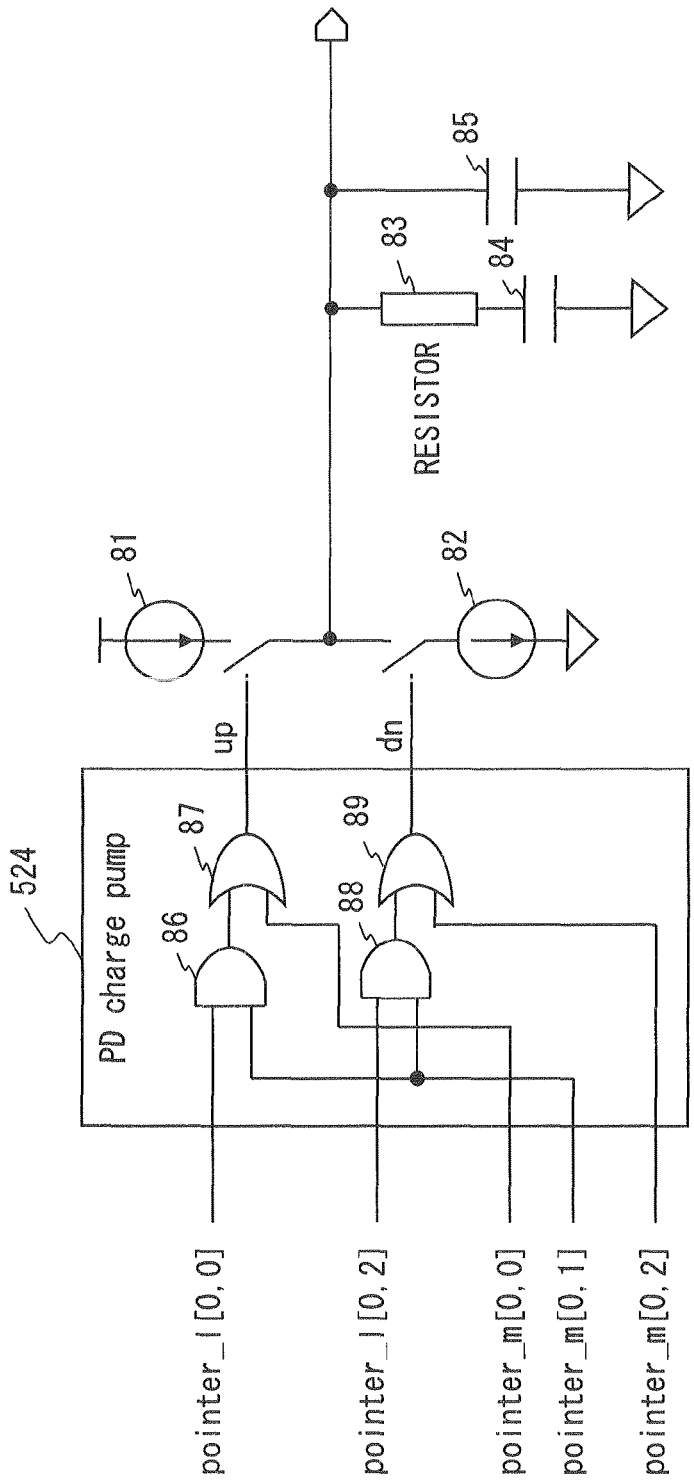
FIG. 17 shows the charge pump and filter.

FIG. 17 shows the charge pump controller 524, charge pump and loop filter. Current sources 81 and 82 are connected to the charge pump controller 524 and can be switched over. In order to stabilize the charge pump, a resistor 83 and capacitor 84 are connected to it in series, and a capacitor 85 is also connected to it (including a loop filter).

The charge pump controller 524 comprises, for example, ANDs 86 and 88 and ORs 87 and 89. Pointer_l[0,0] and pointer_m[0,1] are connected to the AND 86, and pointer_l[0,2] and pointer_m[0,1] are connected to the AND 88. To the OR 87, the output of the AND 86 and pointer_m[0,0] are inputted and outputted from its UP port. To the OR 89, the output of the AND 88 and pointer_m[0,2] are inputted and outputted from its DN port.

The current sources 81 and 82 are controlled and switched over according to its output logic. If UP=1 and DN=0, electric charge flows into the capacitor from the current source 81 while UP is high to generate a DC voltage gain. If UP=0 and DN=1, electric charge is discharged from the capacitor by the current source 82 while DN is high. If UP=0 and DN=0, VCO control voltage is outputted in such a way that its output may be constant without a phase difference.

The Second Preferred Embodiment

Figure 18:
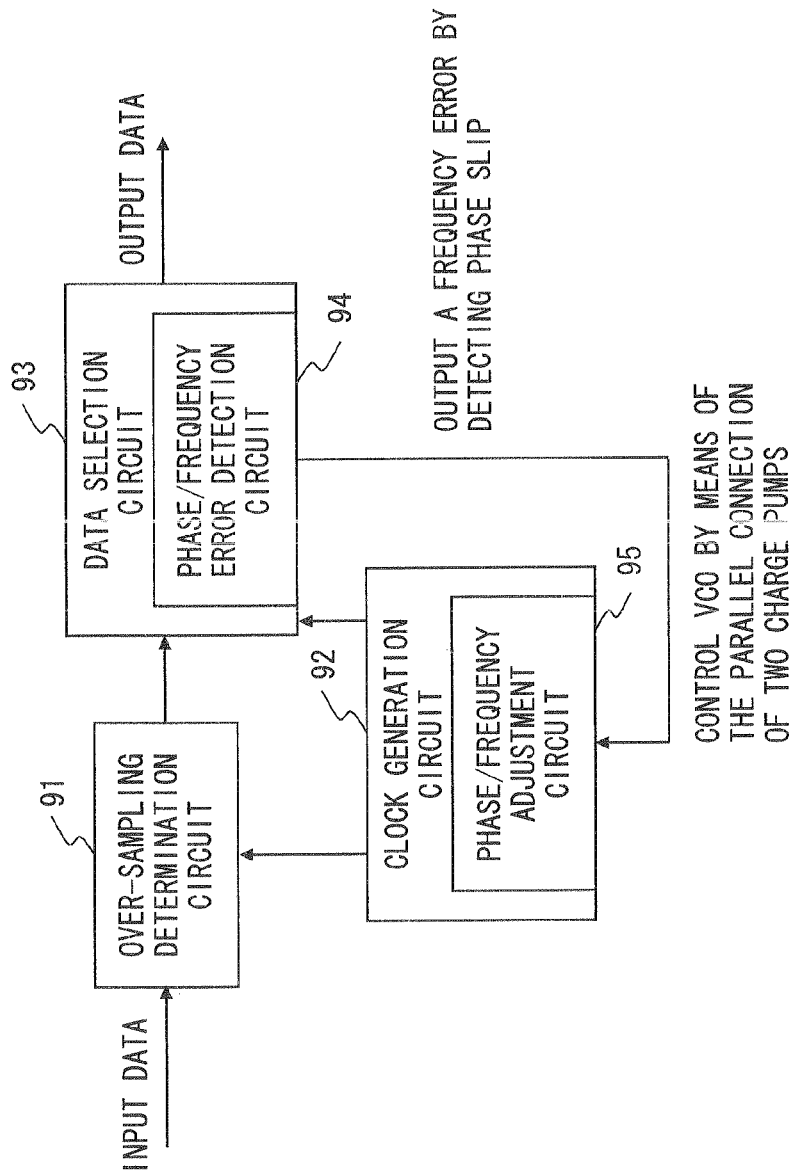
FIG. 18 shows the configuration of the second preferred embodiment.

The over-sampling method CDR circuit in the second preferred embodiment shown in FIG. 18 comprises an over-sampling determination circuit 91, a clock generation circuit 92 and a data selection circuit 93. The over-sampling determination circuit 91 corresponds to the over-sampling determination circuit 31.

The clock generation circuit 92 comprises a phase/frequency adjustment circuit 95. The data selection circuit 93 comprises a phase/frequency error detection circuit 94.

The phase/frequency error detection circuit 94 outputs a frequency error by detecting a phase slip.

The second preferred embodiment differs from the first preferred embodiment in comprising the phase/frequency error detection circuit 94 in which a frequency error detection circuit is incorporated in addition to the phase error detection circuit in the data selection circuit 93. A frequency error can be detected by detecting a phase slip between input data and the driving clock (reproduced clock) of the data selection circuit 93 by a logic circuit and issuing an error signal proportional to the frequency of phase slips. Two charge pumps are driven by the output of the phase/frequency error detection circuit 94 and the sum of their outputs drives the VCO. According to this preferred embodiment, since the frequency pulling of the phase-locked loop (PLL) can be started using a frequency error signal when the PLL activates after power is inputted, there is no need to externally supply a reference clock.

A signal generated by connecting two charge pumps in parallel controls the VCO of the phase/frequency adjustment circuit 95.

A received input data is sampled by a reproduced clock transferred from the clock generation circuit 92 and is transferred to the data selection circuit 93. The data selection circuit 93 outputs data, and also detects a frequency error by the phase/frequency error detection circuit 94. An adjustment signal generated based on the result of the frequency error detection is inputted to the clock generation circuit 92. Then, the phase/frequency adjustment circuit 95 adjusts a clock, based on the result of the frequency detection, and inputs again the regenerated clock to the over-sampling determination circuit 91 and the data selection circuit 93.

The operation of the second preferred embodiment is described with reference to FIG. 19. In this preferred embodiment, the sampling determination circuit 101 determines the binary of input data by a frequency three times as much as the data rate (40 Gbits/second). Therefore, 12 determination circuits for performing binary determination by a 10 GHz toggle frequency supplies 12-phase 10 GHz multi-phase clock from the clock generation circuit 105 to the over-sampling determination circuit 101.

5 G(Hz) 24-bit(bits/second) data obtained in the over-sampling determination circuit 101 is converted into 2.5 G(Hz) 48-bit parallel data by the demultiplexer 102 of the data selection circuit 93 and is inputted to the data/clock reproduction circuit 103 of the data selection circuit 93. The data/clock reproduction circuit 103 incorporates a mechanism for detecting the input data and the frequency error of the reproduced clock for driving the data/clock reproduction circuit 103 (phase/frequency error detection circuit 94 in FIG. 18) and outputs the detected frequency error result (error signal; control signal including frequency error information in this preferred embodiment). The loop filter 104 generates VCO control voltage (a signal for frequency adjustment and a signal for phase adjustment shown by (1) and (2) in FIG. 19).

The VCO control voltage is fed back to the clock generation circuit 105(10 G(Hz)VCO). The clock generation circuit 105 outputs a frequency-adjusted reproduced clock, based on the frequency error detection result. The reproduced clock is inputted to the over-sampling determination circuit 101 and the data selection circuit 103. In order to reproduce the output data, etc., shown as (3) in FIG. 19, the reproduced clock is inputted to the data selection circuit 103. And output data is also generated and outputted.

The data selection circuit 93 can be realized by the configuration shown in FIG. 8. The data selection circuit 33 shown in FIG. 8 comprises a demultiplexer 42, registers 51-515, a selector 516, a shifter 517, a phase detector 518, a phase generation control 519, a phase generator 520, an U/D generator 521, a point generator 522, a decoder 523, a charge pump controller 524, a charge pump 525 and a loop filter 44.

In the demultiplexer 42, data inputted from the over-sampling determination circuit 41 is converted from 5 Gbits/second with 24-bit width to 2.5 Gbits/second with 48-bit width together with the reproduced clock whose 24 G(Hz) is converted to 48 G(Hz), as shown in FIG. 19.

The data reproduction circuit of the data/clock reproduction circuit 103 synchronizes the output S25 (S25[47:0] in this preferred embodiment; signal transmitted with 48-bit bus width) with the registers 51-55 in cycles 0-4 (5-step pipeline process in this preferred embodiment), using the reproduced clock. In cycle 2, the S25c1[2:0] in cycle 1, S25c3[47:45] in the register 513 in cycle 3 and S25c2[47:0] in cycle 2 are inputted to the selector 516, and data ctre2[31:0] with 32-bit width is generated based on data in cycle 2 of the phase generator 520.

In cycle 4, ctrc4[31:0] is shifted in such a way that its output data can have a valid bit width, based on the ctrc4[31:0] and the output code of the decoder 523 and data with 16-bit width (dout[15:0]) is outputted.

As in the first preferred embodiment, in the clock reproduction circuit too, in cycle 0, the output S25[47:0] of the demultiplexer 42 and the output S25c1[47:0] of the register 51 in cycle 1 are inputted to the phase detector 518.

The phase detector 518 transfers them to the phase generation control 519 in cycle 0 and in cycle 1 transfers them to the phase generator 520.

In cycle 1, the phase generator 520 generates a signal, pointer_l, based on the phase signal and a signal pointer_l[7,2:0] in cycle 2. In cycle 2, the output pointer_l[7:0,2:0] of the phase generator 520 and the pointer_le3[7,2:0] of the register 510 in cycle 3 are inputted to the U/D generator 521 pointer_l [0,0] and {0,2} are inputted to the register 511.

Figures 20A, 20B:
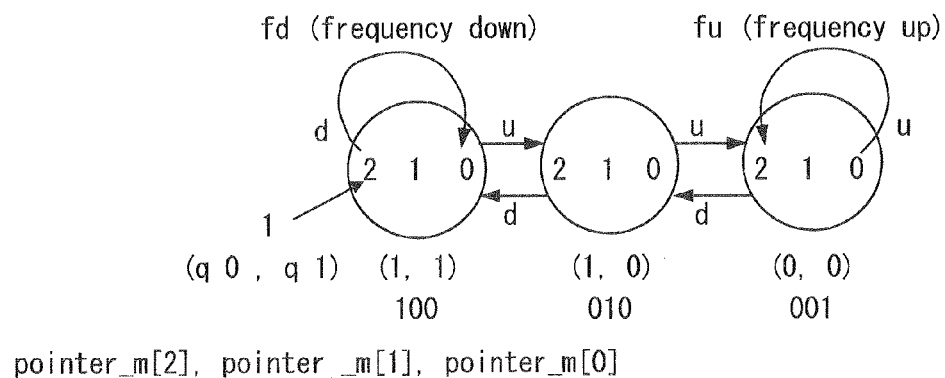
FIGS. 20A and 20B show the detection circuit.

The signal generated in the U/D generator 521 and the q0[7] and q1[7] of the register 512 are inputted to the pointer generator 522 in cycle 3 and its output is inputted to the register 512. In cycle 4, the data of the register 512 is inputted to the decoder 523 to generate pointer_m[7:0,2:0]. The pointer_m[7:0,2:0] is inputted to the charge pump controller 524 together with the pointer_l[0,0] and [0,2] of the register 514. The pointer generation in the second preferred embodiment is described below. FIG. 20A is a table showing the relationship between a pointer code and a selected sample. In FIG. 20A, the detector operates as described in FIG. 13 of the first preferred embodiment.

FIG. 20B explains frequency detection. Although in the first preferred embodiment, control by a frequency error is not performed, in this preferred embodiment, control by a frequency error is simultaneously performed. In this case, the pointer generator 522 is controlled by the transition shown in FIG. 20B. Firstly, when q=0, the pointer generator 522 receives an "up" instruction (u signal) from the U/D generator 521. Alternatively, when the lower side (1) of the table in FIG. 20A is overflowed (over 0), the FD (block) 1105 validates the fu frequency up) signal. If the FD(block) 1105 receives a "down" instruction When q1=1 and underflow occurs on the lower side (l), it validates the fd (frequency down) signal. The description of k is omitted. In this preferred embodiment, fu and fd are 8 bits.

Then, the fu and fd signals are inputted to the register 515, and in cycle 4, they are inputted to the charge pump controller 524.

The case where when the VOC frequency is smaller than the baud signal of data, the lower code (l) transits 2→1→0 and overflow is repeated is described. Pointer_l [2:0] transits from 2(="100") to 0(="001), and q0=O/q1=O are restored. Therefore, overflow does not occur until the phase undergoes a complete cycle slip. Even if q0=0/q1=0 transits to q0=1/q1=0, the fd signal does not occurs. The fd signal occurs when q0=0/q1=0 and underflow occurs. When there is no overflow or underflow, the charge pump charges in proportion to the phase difference between the VCO clock and data.

As described above, in order to maximize the phase tracking range of the CDR circuit, the default position of the pointer must a center (lower code(l)=1 at q0=1/q1=0). The phase detector 518 detects a phase deviation from the center. If phase[0] is detected, the output frequency of the VCO should be increased. If phase[2] is detected, the output frequency of the VCO should be decreased. When pointer_m[0,0]=1, the controller turns on the "up" signal. The "down" signals are turned on at q0=1/q1=1 or when pointer_m[0,2]=1.

Figure 21:
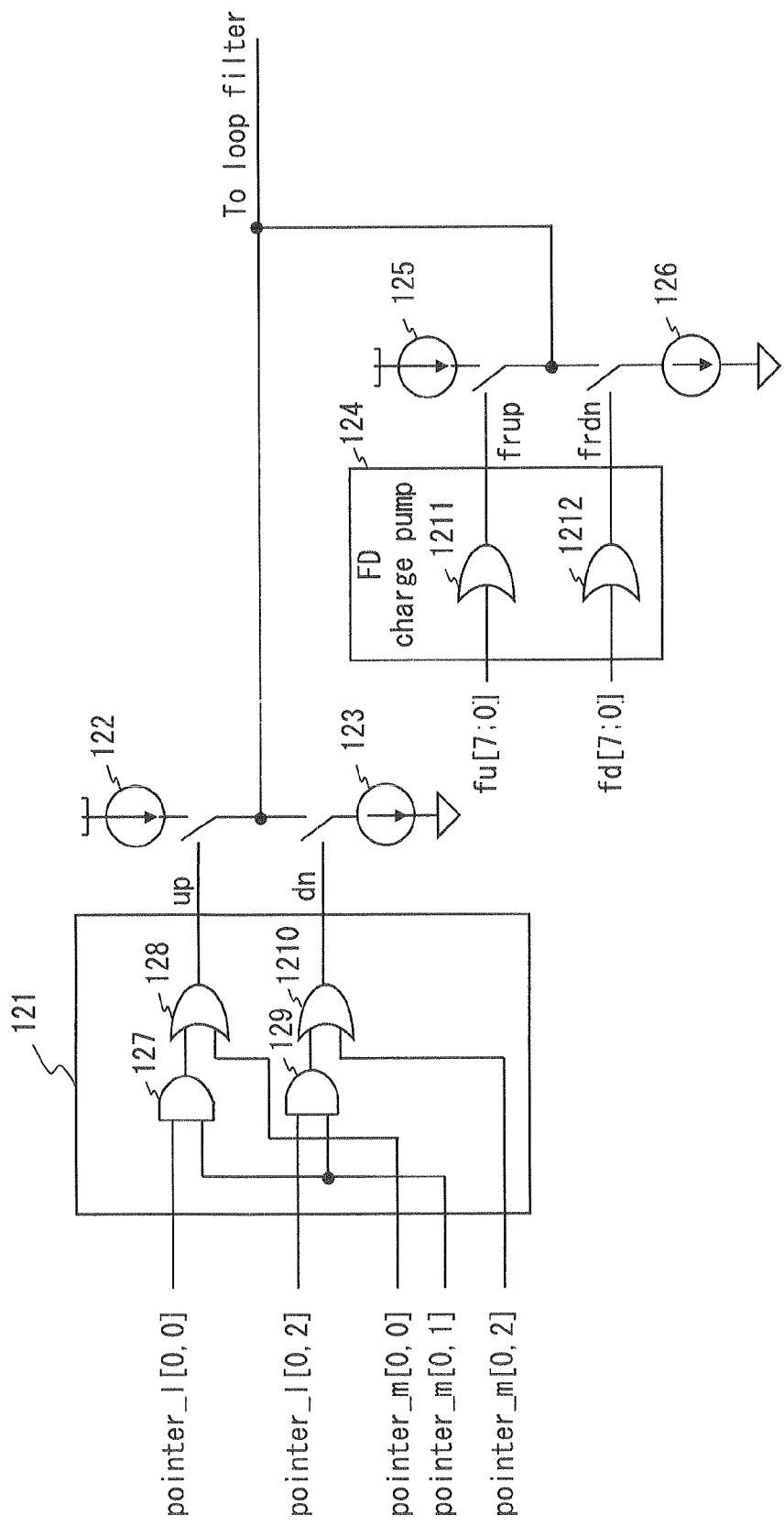
FIG. 21 shows the charge pump and filter.

FIG. 21 shows the charge pump controller 121 and the charge pump. In the case of the second preferred embodiment, the charge pump controller 121 includes a charge pump controller for phase detection and a charge pump controller for frequency detection. To the charge pump controller for phase detection 121, current sources 122 and 123 are connected and can be switched over. To the charge pump controller for frequency detection 124, current sources 125 and 126 are connected and can be switched over. The charge pump also includes one for phase detector and one for frequency detector.

The charge pump controller 121 comprises ANDs 127 and 129, ORs 128 and 1210. Pointer_l[0,0] and pointer_m[0,1] are connected to the AND 127, and Pointer_l[0,2] and pointer_m[0,1] are connected to the AND 129. To the $OR_{128}$, the output of the AND 127 and pointer_m[0,0] are inputted and are outputted from its UP port. To the $OR_{1210}$, the output of the AND 129 and pointer_m[0,2] are inputted and are outputted from its DN port.

The charge pump controller 124 comprises ORs 1211 and 1212. Fu and fd are inputted from the register 515 to the ORs 1211 and 1212, and are outputted from a FrUP port and FrDN port, respectively.

To the charge pump controller 121, current sources 122 and 123 are connected and can be switched over. To the charge pump controller 124, current sources 125 and 126 are connected and can be switched over. Thus, the current sources of the output on its phase detection side and the output on the frequency detection side are switched over and controlled. Then, in order to stabilize the charge pump, a resistor and capacitor are connected to the charge pump controller in series, and a capacitor (including the function of loop filter 44) is connected. Then, VCO control voltage is outputted.

The Third Preferred Embodiment

Figure 22:
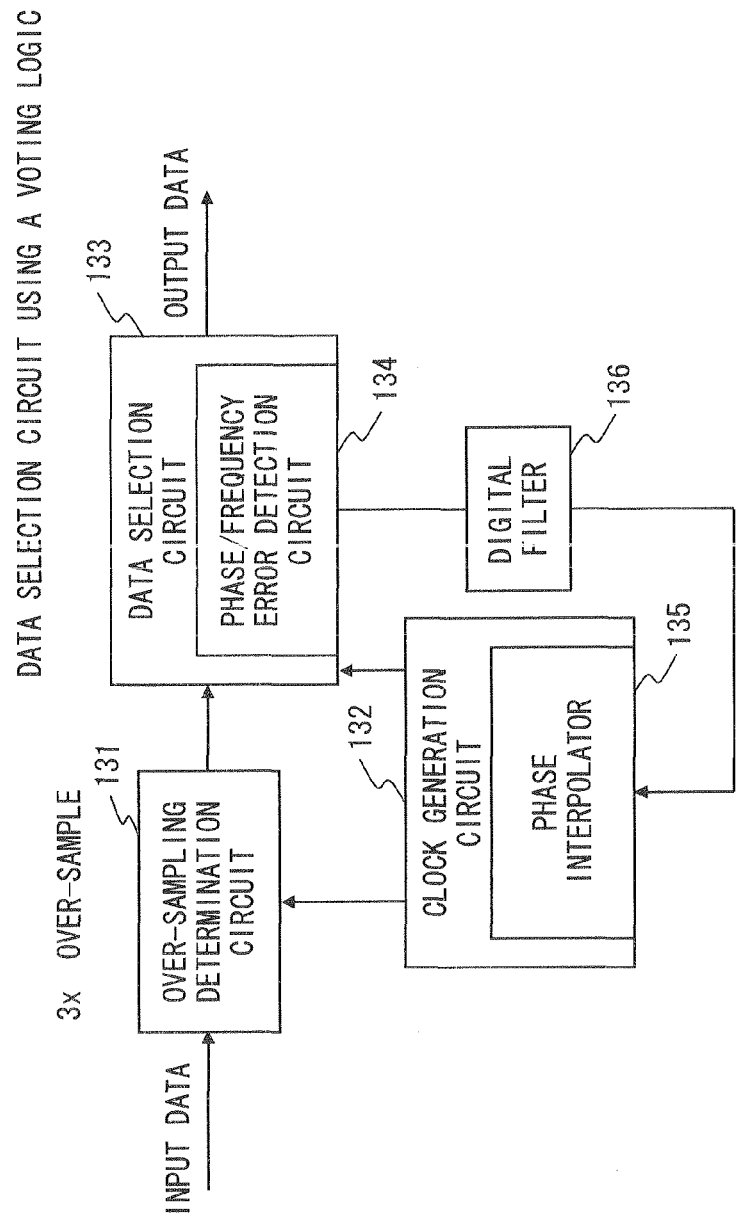
FIG. 22 shows the configuration of the third preferred embodiment.

FIG. 22 shows the configuration of the third preferred embodiment. The third preferred embodiment differs from the first and second preferred embodiments in that the phase adjustment means of the clock generation circuit does not adjust the control voltage of the VCO and a phase interpolator is used.

The phase interpolator generates a phase by combining multi-reference clocks instead of adjusting a phase is an oscillation circuit. Since the phase interpolator converts a digital code into a phase, a phase error signal is fed back to the phase interpolator via a digital filter. Since a VCO is not used, a multi-channel receiver can be easily manufactured.

The over-sampling CDR circuit of the third preferred embodiment comprises an over-sampling determination circuit 131, a clock generation circuit 132, a data selection circuit 133 (or 93) and a digital filter 136. The over-sampling determination circuit 131 corresponds to the over-sampling determination circuit 91. The data selection circuit 133 corresponds to the data selection circuit 93. The clock generation circuit 132 comprises a phase interpolator 135. The data selection circuit 133 comprises a phase/frequency error detection circuit 134. The phase/frequency error detection circuit 134 outputs a frequency error by detecting a phase slip. Received input data is sampled by a reproduced clock transferred from the clock generation circuit, and the samples input data is transferred to the data selection circuit 133. The data selection circuit 133 outputs its data, and also detects a phase error and a frequency error by the phase/frequency error detection circuit 134. A signal generated based on the detection results of these errors is inputted to the clock generation circuit 132. Then, the frequency adjustment circuit 135 adjusts the clock, based on the result of the frequency detection and input the regenerated clock to the over-sampling determination circuit 131 and the data selection circuit 133 again.

Figure 23:
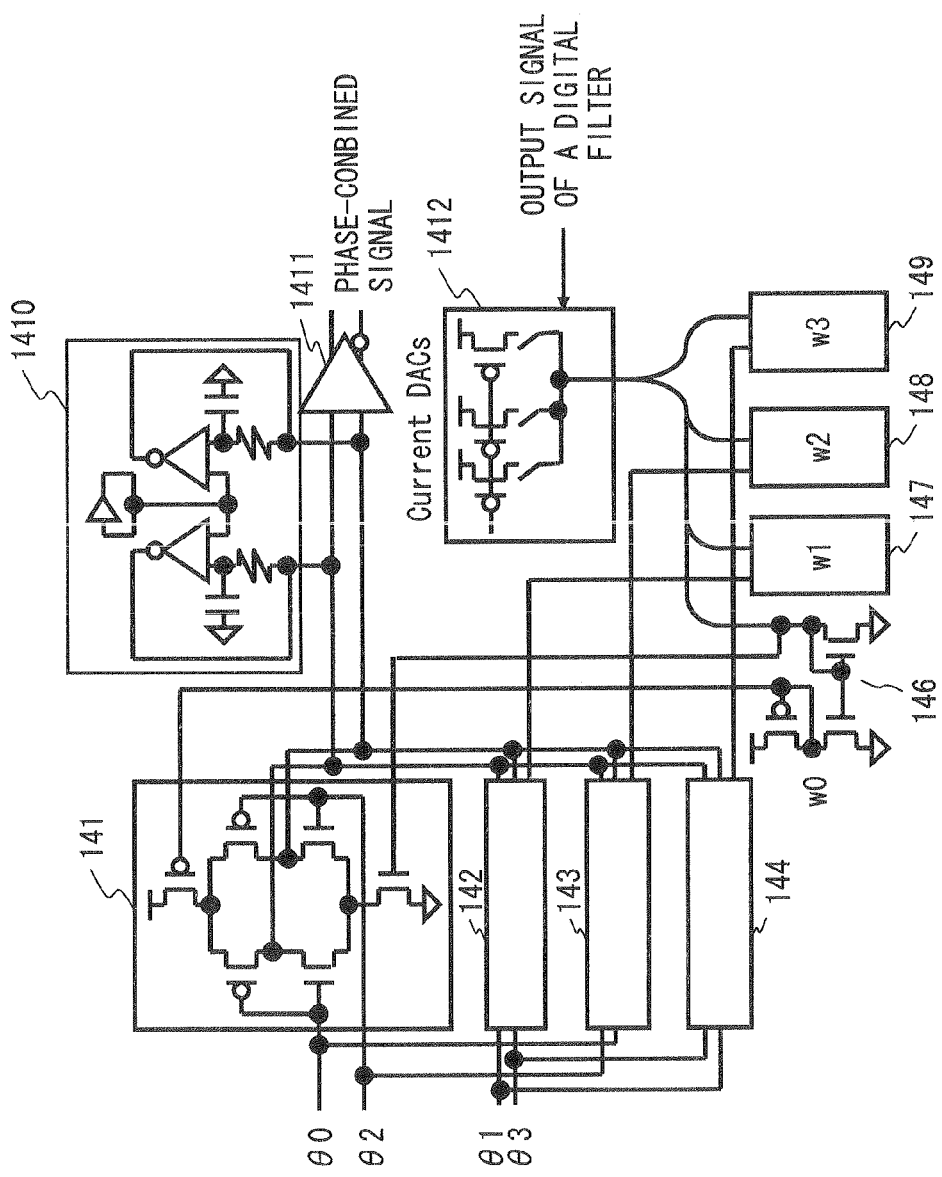
FIG. 23 shows the phase interpolator.

FIG. 23 shows the phase interpolator. The phase interpolator directly supplies, for example, more than three input phases (three or more input signals with different phases) to a phase combination circuit without passing them through a selection circuit to generate a weighing sum. Specifically, circuits 141-144 give weights W0, W1, W2 and W3 to four input phases θ0, θ1, θ2 and θ3 whose phases are different by 90 degrees from each other.

The weights W0, W1, W2 and W3 can be changed by controlling a current digital/analog conversion circuit 1412 by the output signal of the digital filter 136. Furthermore, the weighted input phases generated by the circuits 141-144 (weighted phases W0·θ0, W1·θ1, W2·θ2 and W3·θ3) are summed and outputted (phase-combined signal W0·θ0+W1·θ1+W2·θ2+W3·θ3). In this case, a circuit for matching their common modes 1410 can also be provided and its output can also be obtained from a comparator 1411.

Thus, a highly accurate timing signal can be generated without preventing a phase jump or an error due to the switchover of an input phase from entering. Since the phase interpolator has three or more input phases, can cover 0~360 degrees of an output phase range without switching input phases. The phase interpolator can be operated by a single end clock or a differential clock.

Figure 24:
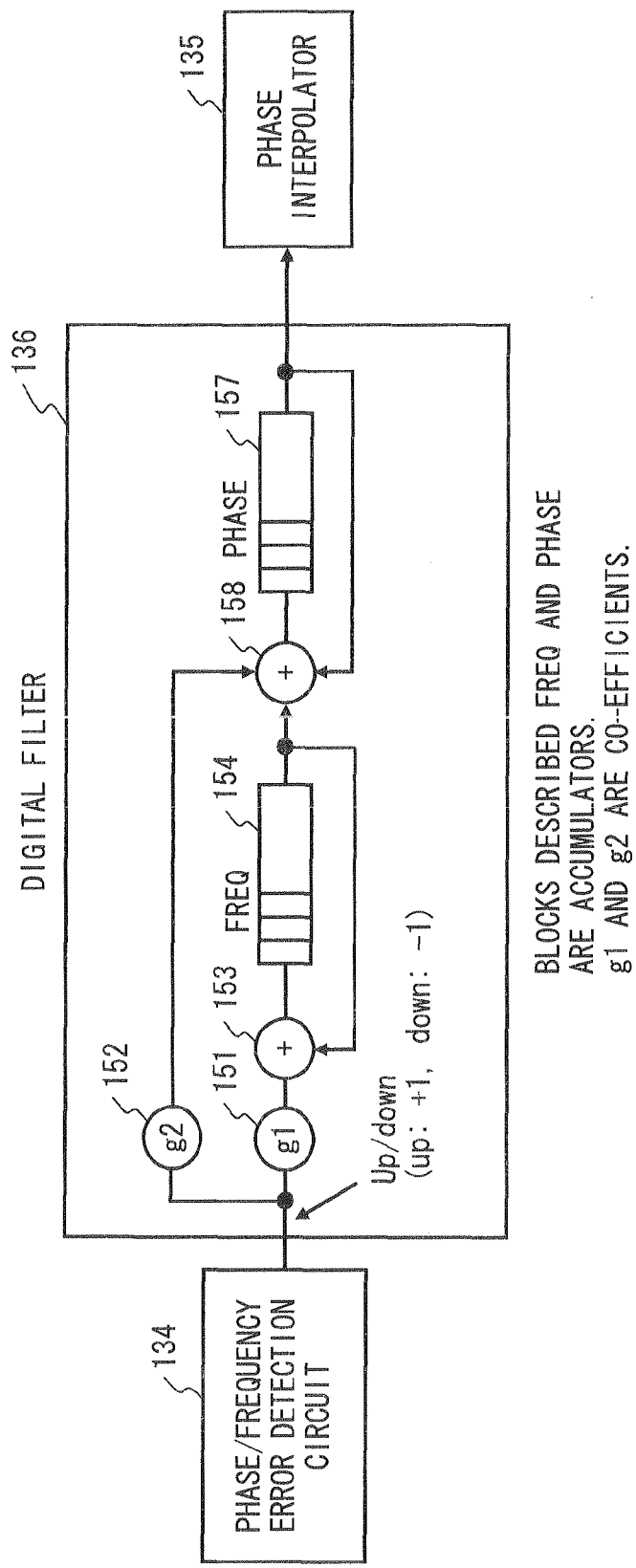
FIG. 24 shows the digital filter.

Then, as shown in FIG. 24, the digital filter 136 multiplies the output data of the phase/frequency error detection circuit 134 by co-efficient 151 (g1) and co-efficient 152 (g2). The signal multiplied by g1 is added to the output of the multiplier 154 by adder 153 and is inputted to the multiplier 154. The signal multiplied by g2 is added to the output of the multiplier 157 by adder 156 and is inputted to the multiplier 157. Thus, the weights W0~W4 of the phase interpolator 135 can be controlled.

When the output of the phase/frequency error detection circuit 134 is up, +1 (+1 is outputted when the upper_code (m)=1 and the lower_code(l)=0 or more in FIG. 13) is inputted to the digital filter 136, which is not shown in FIG. 24. When it is down, −1 (−1 is outputted when the upper_code (m)=1 and the lower_code(l)=2 or less in FIG. 13 is inputted. When the upper_code(m)=1 and the lower_code(l)=1 in FIG. 13), the current state is maintained. The output to the digital filter is converted into a code and transferred in order to control a DAC 1412.

The Fourth Preferred Embodiment

FIG. 25 shows the configuration of the fourth preferred embodiment. The over-sampling CDR circuit of the fourth preferred embodiment comprises an over-sampling determination circuit 161, a clock generation circuit 1_162, a data selection circuit 163 and a clock generation circuit 2_164. The over-sampling determination circuit 161 corresponds to the over-sampling determination circuit 31. The data selection circuit 163 corresponds to the data election circuit 93. The over-sampling determination circuit 161 corresponds to the over-sampling determination circuit 31. The data selection circuit 163 corresponds to the data selection circuit 93. The clock generation circuit 2_164 corresponds to the clock generation circuit 92. The clock generation circuit 2_164 comprises a phase/frequency adjustment circuit 166. The data selection circuit 163 comprises a phase/frequency error detection circuit 165.

The phase/frequency error detection circuit 165 outputs a frequency error by detecting a phase slip as in the second preferred embodiment. The frequency adjustment circuit 166 controls the VCO by output obtained by connecting two charge pumps for phase detection and frequency detection in parallel.

A received input data is sampled by a clock generated based on a reference clock transferred from the clock generation circuit1_162. The sampled input data is transferred to the data selection circuit 163. The data selection circuit 163 outputs its output and also detects a frequency error by the phase/frequency error detection circuit 165. An adjustment signal generated based on the detection result of the frequency error is inputted to the clock generation circuit 2_164. Then, the frequency adjustment circuit 166 adjusts the clock, based on the frequency error detection result. The reproduced clock is inputted to the data selection circuit 163.

The fourth preferred embodiment shown in FIG. 25 differs from the first preferred embodiment in that a target whose frequency is adjusted is a clock for driving the data selection circuit and the clock of the over-sampling determination circuit 161 is driven by an independent clock generation source. As described in the principle of the present invention, in this configuration too, no flow control is needed. Furthermore, the clock generation circuit for determination circuit is simplified thereby reducing jitter transfer from input.

The Fifth Preferred Embodiment

Figure 26:
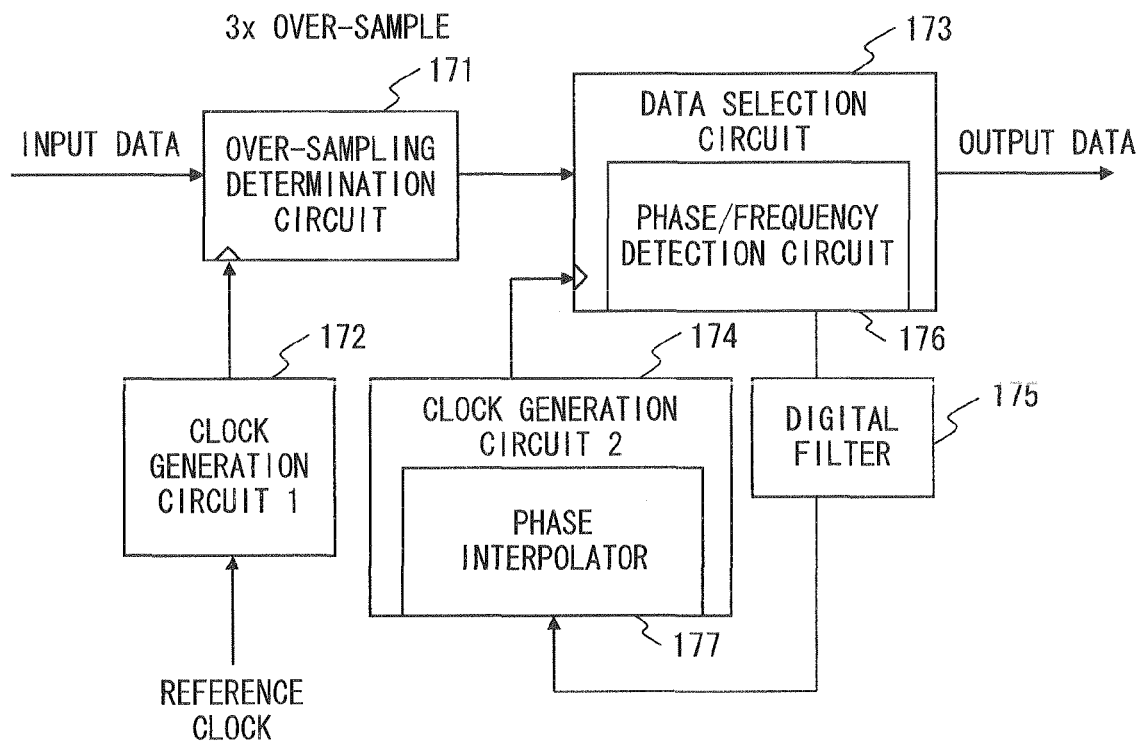
FIG. 26 shows the configuration of the fifth preferred embodiment.

FIG. 26 shows the configuration of the fifth preferred embodiment. The over-sampling CDR circuit of the fifth preferred embodiment comprises an over-sampling determination circuit 171, a clock generation circuit 1_172, a data selection circuit 173, a clock generation circuit 2_174 and a digital filter 175. The over-sampling determination circuit 171 corresponds to the over-sampling determination circuit 161. The clock generation circuit 1_172 corresponds to the clock generation circuit 1_162. The data selection circuit 173 corresponds to the data selection circuit 163. The data selection circuit 173 comprises a phase/frequency error detection circuit 176. The clock generation circuit 2_174 comprises a phase interpolator 177.

A received input data is sampled by a clock transferred from the clock generation circuit 172 and is transferred to the data selection circuit 173. The data selection circuit 173 outputs its data and also detects a frequency error by the phase/frequency error detection circuit 176. An adjustment signal generated based on the detection result of the frequency error is inputted to the digital filter 176. The output of the digital filter 175 is inputted to the phase interpolator 177 of the clock generation circuit 2_174.

The output of the phase/frequency error detection circuit 176 is inputted to the digital filter 175 to control the weight of the phase interpolator 177.

Then, the phase interpolator 177 adjusts the clock, based on the frequency error detection result. The reproduced clock is inputted to the data selection circuit 173.

This preferred embodiment differs from the fourth preferred embodiment in using the phase interpolator 177 in order to adjust the phase of the clock of the data selection circuit 173. In this case, since the phase interpolator 177 is used, the phase can be adjusted by a digital circuit, its lower power and integration can be easily realized. Since the data selection circuit 173 is driven by a frequency lower than that of the over-sampling determination circuit 171, the phase interpolator 177 can be easily designed.

The Sixth Preferred Embodiment

FIG. 27 shows the configuration of the sixth preferred embodiment. The over-sampling CDR circuit of the sixth preferred embodiment comprises an over-sampling determination circuit 181, a clock generation circuit 182, a data selection circuit 183, a clock selection circuit 184 and a PLL 185. The over-sampling determination circuit 181 corresponds to the over-sampling determination circuit 161. The clock generation circuit 182 corresponds to the clock generation circuit 1_162. The data selection circuit 183 corresponds to the data selection circuit 163.

The output of the clock generation circuit 182 is inputted to the over-sampling determination circuit 181 and clock selection circuit 184. An input data sampled by the over-sampling determination circuit 181 is transferred to the data selection circuit 183.

To the data selection circuit 183, a reproduced clock generated by inputting the output of the clock selection circuit 184 to the PLL 185, and inputting the output data of the PLL 185, is inputted.

The clock selection circuit 184 selects and outputs the clock used to sample received data, for example, using a selector similar to the data selection circuit 183. The data selection circuit 183 comprises a phase/frequency error detection circuit in order to control the selector, and the selector is controlled by a value pointed by a pointer (control signal).

The clock of the over-sampling determination circuit 181 is selected by a selection signal synchronized with the data selection signal used in the data selection circuit 183 to generate a second reproduced clock, the PLL which operates referring to this second reproduced clock generates a first reproduced signal and the first reproduced clock drives the data selection circuit 183.

The rough frequency of the clock selected by the clock selection circuit 184 matches the input data, the jitters of its clock edge are large. Therefore, the clock obtained by the clock selection circuit 184 is inputted to the PLL as a reference clock to generate a clock with fewer jitters.

Since this preferred embodiment can be realized only by adding a selector for clock selection, its circuit can be simplified.

The Seventh Preferred Embodiment

Figure 28:
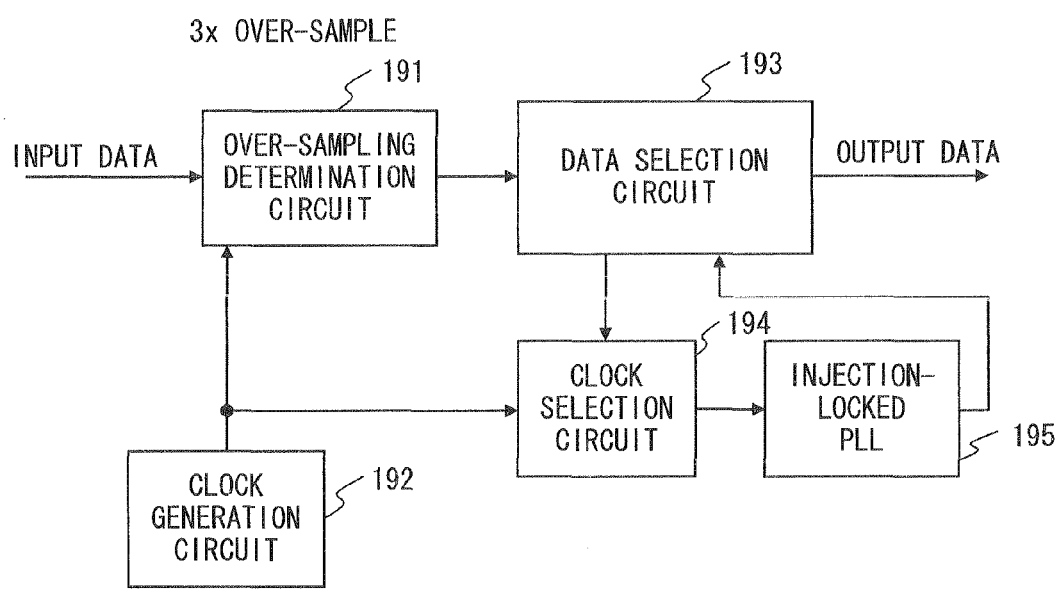
FIG. 28 shows the configuration of the seventh preferred embodiment.

The configuration of the seventh preferred embodiment shown in FIG. 28 is almost the same as that of the sixth preferred embodiment, in which a clock to be given to the data selection circuit 193 is generated by an injection lock PLL instead of an ordinary PLL.

The over-sampling CDR circuit of the seventh preferred embodiment shown in FIG. 28 comprises an over-sampling determination circuit 191, a clock generation circuit 192, a data selection circuit 193, a clock selection circuit 194 (or 184) and an injection lock PLL 195. The over-sampling determination circuit 191 corresponds to the over-sampling determination circuit 161. The clock generation circuit 192 corresponds to the clock generation circuit 1_162. The data selection circuit 193 corresponds to the data selection circuit 163.

The output clock of the clock generation circuit 192 is inputted to the over-sampling determination circuit 191 and the clock selection circuit 194.

Received data sampled by the over-sampling determination circuit 191 is transferred to the data selection circuit 193. The output of the clock selection circuit 194 is inputted to the injection lock PLL 195, and the output of the injection-locked PLL 195 is inputted to the data selection circuit 193 and is selected. Therefore, there is no need to provide a charge pump, a phase detector and the like, thereby reducing its circuit scale.

In this case, to the injection lock PLL 195, the clock selected by the clock selection circuit 194 is compulsorily injected as an external input signal. If the frequency of the external input signal is within its synchronous range, its oscillation frequency is pulled by the external input signal. As a result, a frequency synchronous with the external input signal is oscillated and outputted. In this case, the phase difference between the injected external signal and the output signal is determined by the difference between the frequency of the external input signal and the self-excitation frequency.

According to this preferred embodiment, since the configuration of a PLL used to generate a clock is simplified, a multi-channel clock can be easily generated.

The Eighth Preferred Embodiment

Figure 29:
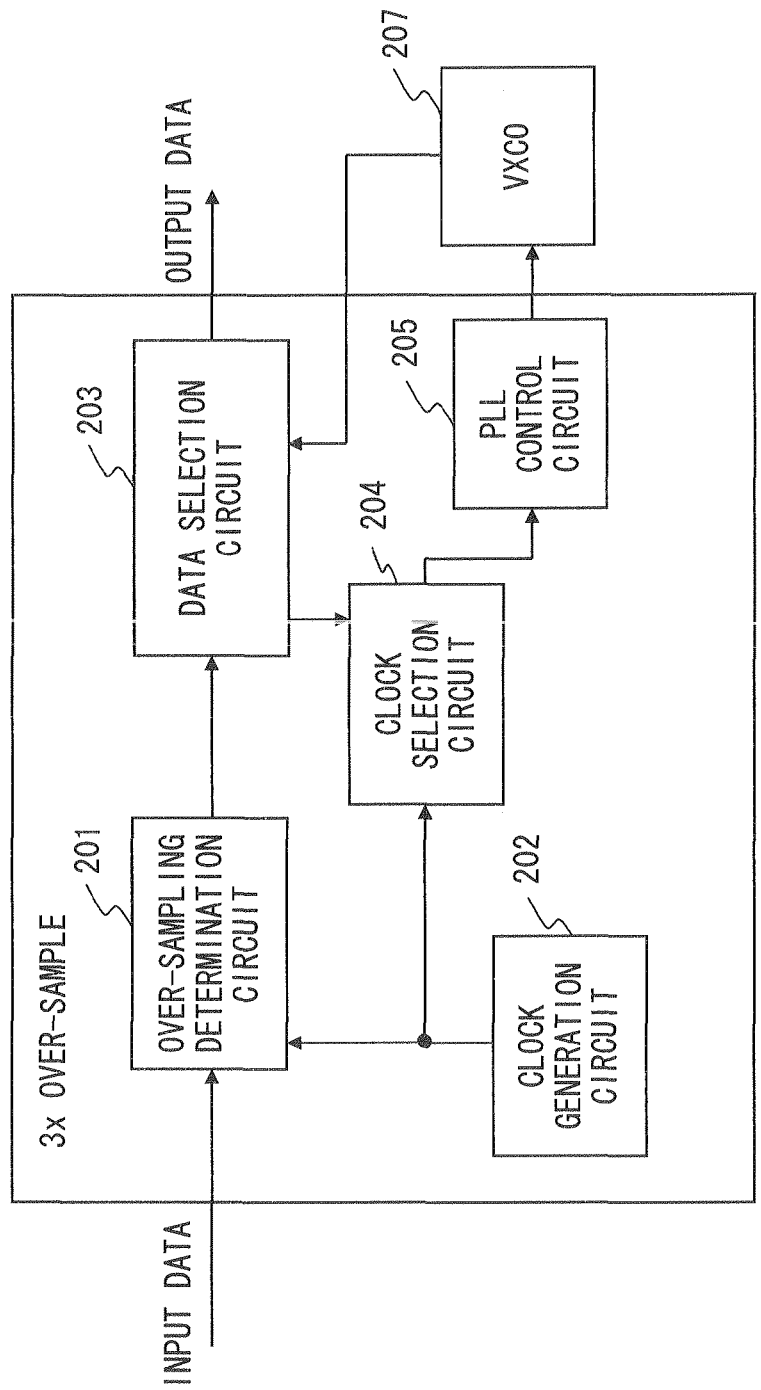
FIG. 29 shows the configuration of the eighth preferred embodiment.

The over-sampling CDR circuit of the eighth preferred embodiment shown in FIG. 29 comprises an over-sampling determination circuit 201, a clock generation circuit 202, a data selection circuit 203, a clock selection circuit 204 and a PLL control circuit 205. A voltage-controlled crystal oscillator (VXCO) 207 is provided and is controlled by the PLL control circuit 205. The over-sampling determination circuit 201 corresponds to the over-sampling determination circuit 161. The clock generation circuit 202 corresponds to the clock generation circuit 1_162. The data selection circuit 203 corresponds to the data selection circuit 163. The clock selection circuit 204 corresponds to the clock selection circuit 194.

The output clock of the clock generation circuit 202 is inputted to the over-sampling determination circuit 201 and the clock selection circuit 204.

Input data sampled by the over-sampling determination circuit 201 is transferred to the data selection circuit 203. The output of the clock selection circuit 204 is inputted to the PLL control circuit 205, and the output data of the PLL control circuit 205 is inputted to the data selection circuit 203 and is selected.

In FIG. 29, an external VXCO 207 is used instead of a PLL in order to generate a clock. The external VXCO 207 can obtain a low-jitter clock with less jitter transfer from the data side.

Figure 30:
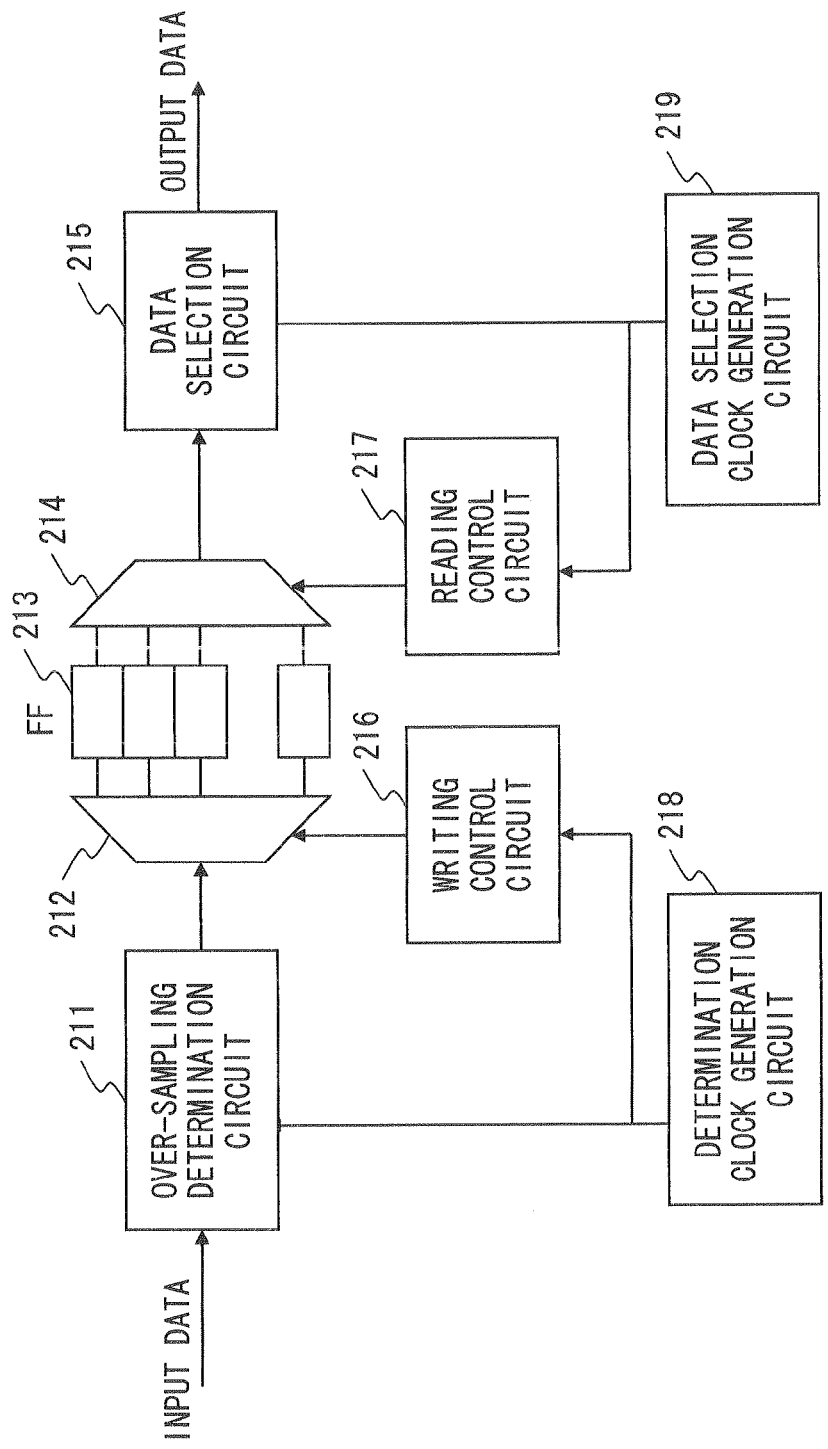
FIG. 30 shows the configuration of the ninth preferred embodiment.

FIG. 30 shows the configuration of the ninth preferred embodiment. The over-sampling CDR circuit of the ninth preferred embodiment shown in FIG. 30 comprises an over-sampling determination circuit 211, a selector 212, a ring buffer 213 (FF), a selector 214, a data selection circuit 215, a writing control circuit 216, a reading control circuit 217, a determination clock generation circuit 218 and a data selection clock generation circuit 219. The over-sampling determination circuit 211 corresponds to the over-sampling determination circuit 161. The data selection circuit 215 corresponds to the data selection circuit 163.

This is used in the case where the clock of the over-sampling determination circuit 211 and data rate is at no simple integral ratio.

The determination clock generation circuit 218 generates clock signals to be supplied to the over-sampling determination circuit 211 and the writing control circuit 216.

The data selection clock generation circuit 219 generates clock signals to be supplied to the data selection circuit 215 and the reading control circuit 217.

The ring buffer 213 controls the selector 212 by a signal controlled by the writing control circuit 216 and adjusts the writing timing of received data that is sampled by the ring buffer 213. Then, the reading timing of the selector 214 is adjusted by a signal controlled by the reading control circuit 217, and data is read from the ring buffer 213 and is outputted to the data selection circuit 215.

In this preferred embodiment, the output of the over-sampling determination circuit 211 is stored in the ring buffer 213. By reading the contents of this ring buffer 213 in synchronization with the data selection circuit 215, the operation is performed without any problem even when there is a frequency difference. If a writing clock and a reading clock are at no simple integral ratio, generally data for one bit is lost or overlapped. However, by adopting over-sampling like this preferred embodiment, the overlap/missing of bits do not immediately lead to a data error. By using clocks at no integral ratio, the problem of interference between the clocks can be avoided.

The present invention is not limited to the above-described preferred embodiments. The present invention can be variously improved and modified as long as no subject matter is deviated.

What is claimed is:

1. A data reproduction circuit for receiving data and reproducing data and a clock, comprising:
   an over-sampling determination circuit for sampling the received data by a first reproduced clock with a frequency higher than a data rate of the received data, so as to convert the received data into digital signals;
   a data selection circuit having a first circuit for reproducing data from the digital signals based on the first reproduced clock and for outputting the data, and having a phase/frequency error detection circuit for detecting a phase error and a frequency error from a timing difference between the first reproduced clock and the digital signals so as to generate and output an adjustment signal based on the phase error and the frequency error; and
   a clock generation circuit having a phase/frequency adjustment circuit for adjusting a phase and a frequency of the first reproduced clock using the adjustment signal,
   wherein the clock generation circuit provides the first reproduced clock having an adjusted phase and adjusted frequency to the over-sampling determination circuit and the data selection circuit,
   wherein the phase/frequency error detection circuit detects a data change timing of the over-sampled data based on the first reproduced clock, generates a phase signal from the data change timing, converts the phase signal into a pointer signal that indicates movement of the phase signal, and outputs the pointer signal as the adjustment signal in order to adjust a phase of the first reproduced clock.

2. The data reproduction circuit according to claim 1, wherein:
   the phase/frequency adjustment circuit is a phase interpolator; and wherein the data reproduction circuit further comprises a digital filter for generating a weighting signal which controls the phase interpolator on the basis of the adjustment signal of the phase/frequency error detection circuit and for outputting the weighting signal to the phase interpolator.

3. The data reproduction circuit according to claim 1, wherein the frequency/phase error detection circuit generates a signal for adjusting a frequency from the pointer signal, and outputs the signal for adjusting a frequency and the adjustment signal for adjusting a phase.

4. The data reproduction circuit according to claim 1, wherein the phase/frequency error detection circuit includes a charge pump and a loop filter, and a current source of the charge pump is controlled and switched by the pointer signal such that an output of the charge pump is converted into the adjustment signal by the loop filter.

5. A data reproduction circuit for receiving data and reproducing data and a clock, comprising:
   an over-sampling determination circuit for sampling the received data by a first reproduced clock with a frequency higher than a data rate of the received data, so as to convert the received data into digital signals;
   a data selection circuit having a first circuit for reproducing data from the digital signals based on the first reproduced clock and for outputting the data, and having a phase/frequency error detection circuit for detecting a phase error and a frequency error from a timing difference between the first reproduced clock and the digital signals so as to generate and output an adjustment signal based on the phase error and the frequency error; and
   a clock generation circuit having a phase/frequency adjustment circuit for adjusting a phase and a frequency of the first reproduced clock using the adjustment signal,
   wherein the clock generation circuit provides the first reproduced clock having an adjusted phase and adjusted frequency to the over-sampling determination circuit and the data selection circuit,
   wherein the phase/frequency error detection circuit performs a phase detect process and a phase generation control process (in a cycle 0), a phase generate process (in a cycle 1), an up/down (U/D) generate process (in a cycle, 2), a pointer generate process (in a cycle 3), a decode process and a charge pump control process (in a cycle 4) in a pipeline process based on the first reproduced clock.

* * * * *